US011255153B2

(12) United States Patent
Brown

(10) Patent No.: US 11,255,153 B2
(45) Date of Patent: Feb. 22, 2022

(54) SEAL APPARATUS AND METHODS OF USE

(71) Applicants: Peak Well Systems Pty Ltd, Bayswater (AU); PEAK WELL SYSTEMS LIMITED, Aberdeen (GB)

(72) Inventor: Gareth Edward George Brown, Aberdeen (GB)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 39 days.

(21) Appl. No.: 16/625,791

(22) PCT Filed: Jun. 28, 2018

(86) PCT No.: PCT/GB2018/051826
§ 371 (c)(1),
(2) Date: Dec. 23, 2019

(87) PCT Pub. No.: WO2019/002882
PCT Pub. Date: Jan. 3, 2019

(65) Prior Publication Data
US 2021/0156219 A1    May 27, 2021

(30) Foreign Application Priority Data
Jun. 28, 2017    (GB) .................................... 1710376

(51) Int. Cl.
*E21B 33/12*    (2006.01)
*E21B 33/13*    (2006.01)
*F16J 15/3284*    (2016.01)
(52) U.S. Cl.
CPC .......... *E21B 33/1208* (2013.01); *E21B 33/13* (2013.01); *F16J 15/3284* (2013.01)

(58) Field of Classification Search
CPC .... E21B 33/1208; E21B 33/13; F16J 15/3284
See application file for complete search history.

(56) References Cited

U.S. PATENT DOCUMENTS 2,143,106 A * 1/1939 Freedlander ........ E21B 33/1208
277/341
2,780,294 A    2/1957 Loomis
(Continued)

FOREIGN PATENT DOCUMENTS

CN    105927173 A    9/2016
CN    106089148 A    11/2016
(Continued)

OTHER PUBLICATIONS

International Search Report and Written Opinion issued in the related PCT Application PCT/GB2018/051826, dated Oct. 16, 2018 (10 pages).
(Continued)

*Primary Examiner* — Steven A MacDonald
(74) *Attorney, Agent, or Firm* — Ashley E. Brown

(57) ABSTRACT

A seal apparatus and method of use is described. The seal apparatus comprises a seal assembly comprising a plurality of elements assembled together to form a ring structure around a longitudinal axis. The ring structure is operable to be moved between an expanded condition and a collapsed condition by movement of the plurality of elements. The plurality of elements is operable to be moved between the expanded and collapsed conditions by sliding with respect to one another along respective contact surfaces. Each of the plurality of elements is a compound element comprising a substrate and at least one seal member disposed on a part of a surface of the element.

20 Claims, 14 Drawing Sheets

(56) References Cited

U.S. PATENT DOCUMENTS

| | | | |
|---|---|---|---|
| 3,837,947 A | 9/1974 | Malone | |
| 4,098,516 A * | 7/1978 | Murman | E21B 33/06 251/1.2 |
| 7,422,071 B2 * | 9/2008 | Wilkie | E21B 33/1208 166/179 |
| 7,669,665 B2 | 3/2010 | Millet et al. | |
| 8,176,933 B2 * | 5/2012 | Huff | B29C 35/0288 137/315.02 |
| 8,291,989 B2 | 10/2012 | Kilgore | |
| 9,353,606 B2 * | 5/2016 | Bruce | E21B 23/00 |
| 10,364,639 B2 | 7/2019 | Svartvatn et al. | |
| 10,487,614 B2 * | 11/2019 | MacDonald | E21B 33/128 |
| 10,883,330 B2 * | 1/2021 | Ellison | E21B 33/1208 |
| 2006/0272806 A1 * | 12/2006 | Wilkie | E21B 33/1208 166/192 |
| 2007/0131413 A1 * | 6/2007 | Millet | E21B 33/1216 166/115 |
| 2016/0168943 A1 * | 6/2016 | Hare | E21B 33/128 166/387 |
| 2016/0222749 A1 * | 8/2016 | Ellison | E21B 33/1208 |
| 2016/0230496 A1 * | 8/2016 | Lastra | E21B 33/1208 |
| 2017/0211348 A1 * | 7/2017 | Buyers | E21B 33/1216 |
| 2019/0323316 A1 * | 10/2019 | Brown | E21B 33/1208 |
| 2019/0352988 A1 * | 11/2019 | Brown | E21B 23/01 |
| 2019/0352997 A1 * | 11/2019 | Brown | E21B 33/134 |
| 2019/0360288 A1 * | 11/2019 | Brown | E21B 33/1216 |
| 2019/0368274 A1 * | 12/2019 | Brown | E21B 10/32 |
| 2019/0368558 A1 * | 12/2019 | Brown | F16D 13/10 |
| 2021/0071496 A1 * | 3/2021 | Brown | E21B 33/1212 |
| 2021/0131219 A1 * | 5/2021 | Brown | E21B 23/01 |

FOREIGN PATENT DOCUMENTS

| | | |
|---|---|---|
| WO | 2015175407 A1 | 11/2015 |
| WO | 2015175410 A1 | 11/2015 |
| WO | 2016009211 A2 | 1/2016 |
| WO | 2017109506 A2 | 6/2017 |
| WO | 2017109508 A1 | 6/2017 |
| WO | 2017109509 A1 | 6/2017 |
| WO | 2018087553 A1 | 5/2018 |

OTHER PUBLICATIONS

Office Action issued in the EP Application 18752187.7, dated Jan. 14, 2021 (6 pages).

International Preliminary Report on Patentability issued in the related PCT Application PCT/GB2018/051826, dated Dec. 31, 2019 (7 pages).

First Office Action issued in Chinese Patent Application No. 201880049862.X dated Aug. 17, 2021, 45 pages with English translation.

* cited by examiner

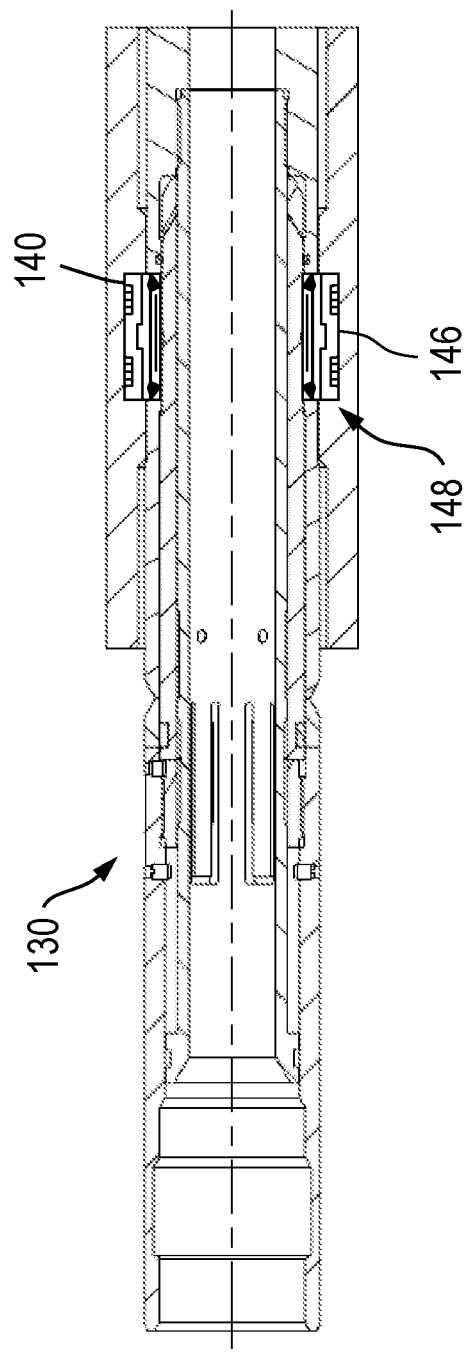
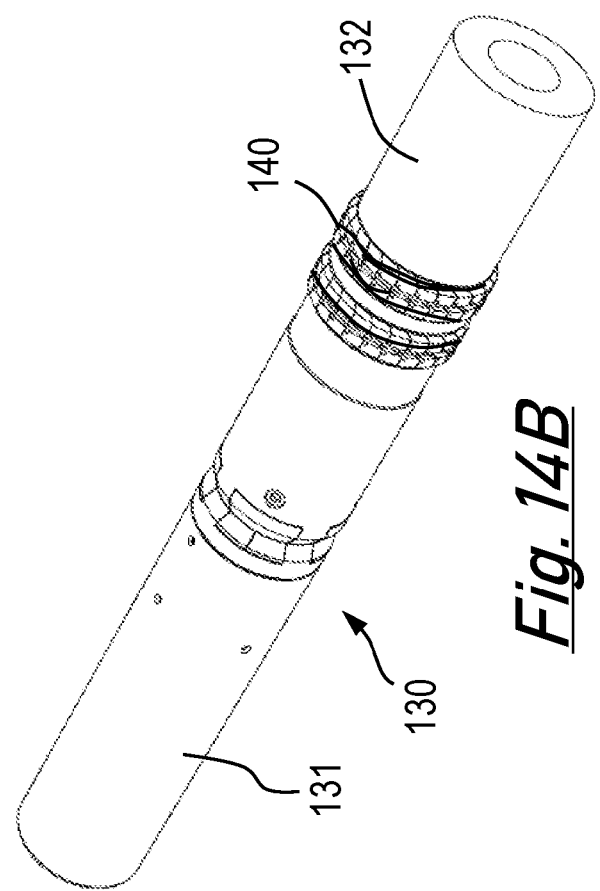

SEAL APPARATUS AND METHODS OF USE

CROSS-REFERENCE TO RELATED APPLICATIONS

This application is a 371 national stage application of PCT/GB2018/051826, filed Jun. 28, 2018, which claims the benefit of Great Britain Application No. 1710376.3, filed Jun. 28, 2017, the disclosures of which are incorporated herein by reference.

FIELD OF THE INVENTION

The present invention relates to a seal apparatus and methods of use, and in particular aspects, to a segmented seal apparatus in the form of a ring, operable to move between a collapsed condition and an expanded condition. The invention also relates to expanding and collapsing apparatus configured to create a seal. The invention also relates to tools and devices incorporating the seal apparatus and methods of use. Preferred embodiments of the invention relate to oilfield apparatus (including but not limited to downhole apparatus and wellhead apparatus) incorporating the seal apparatus and methods of use.

BACKGROUND TO THE INVENTION

In many fields of mechanical engineering, and in the field of hydrocarbon exploration and production in particular, it is known to provide flow barriers and seal elements, which may take the form of plugs and packers.

A typical seal element of a downhole tool is a unitary annular elastomeric element, sized to an outer diameter suitable for running the tool. During deployment, the seal element is compressed to expand radially outwardly into contact with a surrounding surface, and the seal element is designed to seal against a pressure differential between respective upper and lower annular regions on opposing sides of the seal element. It is known to provide anti-extrusion rings positioned between a packer or seal element and its actuating slip members, typically formed from a split or segmented metallic ring. During deployment of the packer or seal element, the segments of the anti-extrusion rings move to a radially expanded condition. During expansion and at the radially expanded condition, spaces are formed between the segments, as they are required to occupy a larger annular volume. These spaces create extrusion gaps, which may result in failure of the packer or seal under working conditions.

WO2017/109506, WO2017/109508, WO2017/109509 and WO2018/087553 describe arrangements of expanding and collapsing apparatus which create solid rings at their expanded conditions and use in a wide range of applications, including effective performance as anti-extrusion rings for adjacent seal elements.

SUMMARY OF THE INVENTION

It is amongst the claims and objects of the invention to provide a seal apparatus and methods of use which obviate or mitigate disadvantages of previously proposed seal apparatus and methods.

It is amongst the claims and objects of the invention to provide an expanding or collapsing apparatus and methods of use which obviate or mitigate disadvantages of previously proposed expanding or collapsing apparatus and methods.

It is amongst the aims and objects of the invention to provide an oilfield apparatus, including a downhole apparatus or a wellhead apparatus, incorporating a seal apparatus, which obviates or mitigates disadvantages of prior art oilfield apparatus.

It is amongst the aims and objects of the invention to provide an oilfield apparatus, including a downhole apparatus or a wellhead apparatus, incorporating expanding or collapsing apparatus, which obviates or mitigates disadvantages of prior art oilfield apparatus.

Further aims and objects of the invention will be apparent from reading the following description.

According to a first aspect of the invention, there is provided a seal apparatus comprising: a seal assembly comprising a plurality of elements assembled together to form a ring structure around a longitudinal axis;

wherein the ring structure is operable to be moved between an expanded condition and a collapsed condition by movement of the plurality of elements;

and wherein the plurality of elements is operable to be moved between the expanded and collapsed conditions by sliding with respect to one another along respective contact surfaces;

and wherein each of the plurality of elements is a compound element comprising a substrate and at least one seal member disposed on a part of a surface of the element.

Preferably, the at least one seal member is configured to conform, deform, or compress in use. The at least one seal member may be formed from a compliant, compressible or resilient material.

The at least one seal member preferably defines a part of an outer surface of the element.

The at least one seal member may be formed from a plastic, rubber, or elastomeric material, which may comprise a rubberised plastic. The at least one seal member may be fully formed from the compliant, compressible or resilient material. Each of the at least one seal members may be a unitary seal member formed from the compliant, compressible or resilient material.

The at least one seal member may be formed from a nitrile rubber such as a Hydrogenated Nitrile Butadiene Rubber (HNBR). Alternatively, or in addition, the at least one seal member may be formed from a fluoroelastomer, fluoropolymer or fluoro rubber, which may for example be an FKM or FPM such as the FPM manufactured by or under license from DuPont Performance Elastomers and designated by the registered trade mark VITON®. Alternatively, or in addition, the at least one seal member may be formed from a fluoroelastomer based upon an alternating copolymer of tetrafluoroethylene and propylene rubber, such as the fluoropolymer manufactured by or under license from Asahi Glass Co., Ltd and designated by the registered trade mark AFLAS®.

Embodiments of the invention may comprise seal elements formed from a material with a hardness greater than that of rubbers such as HNBR, and may for example comprise a synthetic fluoropolymers of tetrafluoroethylene such as polytetrafluoroethylene (PTFE), polyaryletherketones such as polyether ether ketone (PEEK), or thermoplastics with suitable hardness characteristics while retaining the requisite compliance, compressibility or resilience of the material.

The substrate may be formed from a material with greater rigidity and/or hardness than the material of the seal member. The substrate may be formed from a metal or a metal alloy or a composite material. Preferably the substrate is formed from steel.

The substrate may define a chassis or carrier for the one or more seal elements. The at least one seal member may be adhered, bonded, or otherwise joined or integrated with the substrate. Preferably the at least one seal member is bonded to the substrate.

Optionally the substrate and/or the seal member are formed by a three-dimensional printing process. Optionally the substrate and/or the seal member are formed by an injection moulding process. Alternatively, or in addition, the substrate and/or the seal member are formed by a casting process. Alternatively, or in addition, the substrate and/or the seal member are formed by machining from a larger volume or body of material.

The ring structure is preferably operable to be moved between the expanded and collapsed conditions to be presented to a surface in use. The ring structure may be operable to be expanded or collapsed to a seal diameter, at which the plurality of elements are presented to the surface in use. The seal diameter may be an expanded diameter of the ring structure, and may be an outer diameter of the ring structure. Alternatively, the seal diameter may be a collapsed diameter of the ring structure, and may be an inner diameter of the ring structure.

The surface may be a cylindrical surface, with which the seal apparatus is configured to create a seal in use. The surface may be an inner surface of a tubular, tool or borehole. The surface may be an outer surface of an object, including but not limited to a tubular, a mandrel, a rod, drill pipe, a cable, or a wireline.

By moving the plurality of elements between the expanded and collapsed conditions by sliding with respect to one another along respective contact surfaces, the elements may be deployed to a seal diameter with negligible stress or strain being introduced into the elements during deployment.

The seal apparatus may define one or more anti-extrusion and/or support rings. The seal apparatus may define one or more additional expanding and collapsing ring structures, which may function as anti-extrusion and/or support rings for a further seal assembly.

The seal apparatus may define first and second additional expanding and collapsing ring structures, which may be disposed on opposing axial sides of a further seal assembly.

The plurality of elements may each be based on a notional wedge-shaped segment of a ring centred on an axis, with each notional wedge-shaped segment being inclined with respect to the radial direction of the ring.

The ring structure may be oriented in a plane around the longitudinal axis. The ring structure may be operable to be moved between an expanded condition and a collapsed condition by movement of the plurality of elements on actuation by an axial force. The plane of the ring structure may be perpendicular to the longitudinal axis. The ring structure, and its plane of orientation, may be operable to move on the apparatus during expansion and/or collapsing. The movement of the plane may be an axial sliding movement, during expanding and/or collapsing of the ring structure.

The plurality of elements may be operable to be moved between the expanded and collapsed conditions by sliding with respect to one another in the plane of the ring structure, optionally in a direction tangential to a circle concentric with the ring structure. The elements may be configured to move between their expanded and collapsed radial positions in a path which is tangential to a circle described around and concentric with the longitudinal axis.

Preferably, each element of the ring structure comprises a first contact surface and second contact surface respectively in abutment with first and second adjacent elements.

The first contact surface and/or the second contact surface may be oriented tangentially to a circle described around and concentric with the longitudinal axis. The first contact surface and the second contact surface are preferably non-parallel. The first contact surface and the second contact surface may converge towards one another in a direction towards an inner surface of the ring structure (and may therefore diverge away from one another in a direction away from an inner surface of the ring structure).

At least some of the elements are preferably provided with interlocking profiles for interlocking with an adjacent seal element. Preferably the interlocking profiles are formed in the first and/or second contact surfaces. Preferably, an element is configured to interlock with a contact surface of an adjacent element. Such interlocking may prevent or restrict separation of assembled adjacent elements in a circumferential and/or radial direction of the ring structure, while enabling relative sliding movement of adjacent elements.

Preferably, at least some of, and more preferably all of, the elements assembled to form a ring structure are identical to one another, and each comprises an interlocking profile which is configured to interlock with a corresponding interlocking profile on another element. The interlocking profiles may comprise at least one recess such as groove, and at least one protrusion, such as a tongue or a pin, configured to be received in the groove. The interlocking profiles may comprise at least one dovetail recess and dovetail protrusion.

The first and second contact surfaces of an element may be oriented on first and second planes, which may intersect an inner surface of the ring at first and second intersection lines, such that a sector of an imaginary cylinder is defined between the longitudinal axis and the intersection lines. The central angle of the sector may be 45 degrees or less. Such a configuration corresponds to eight or more elements assembled together to form the ring structure.

Preferably, the central angle of the sector is 30 degrees or less, corresponding to twelve or more elements assembled together to form the ring. More preferably, the central angle of the sector is in the range of 10 degrees to 20 degrees, corresponding to eighteen to thirty-six elements assembled together to form the ring. In a particularly preferred embodiment, the central angle of the sector is 15 degrees, corresponding to twenty-four elements assembled together to form the ring structure.

Preferably, an angle described between the first contact and second contact surfaces corresponds to the central angle of the sector. Preferably therefore, an angle described between the first contact and second contact surfaces is in the range of 10 degrees to 20 degrees, and in a particularly preferred embodiment, the angle described between the first contact and second contact surfaces is 15 degrees, corresponding to twenty-four elements assembled together to form the ring structure.

In some embodiments, the apparatus is operated to provide a seal in its expanded condition, and in other embodiments, the apparatus is operated to provide a seal in its collapsed condition. Preferably, elements forming the ring structure are mutually supportive in an operating condition of the apparatus. Where the operating condition of the apparatus its expanded condition (i.e. when the apparatus is operated in its expanded condition), the ring structure is preferably a substantially solid ring structure in its expanded condition, and the elements may be fully mutually supported.

Where the operating condition of the apparatus its collapsed condition (i.e. when the apparatus is operated in its collapsed condition), the ring structure is preferably a substantially solid ring structure in its collapsed condition, and the elements may be fully mutually supported.

The substrate may define one or both of the outer axial surfaces, side walls or flanks of the elements. The substrate may comprise at least one formation cooperating with the at least one seal member. The at least one formation may be a recess on a surface of the substrate. The recess may define a volume which receives at least a part of the at least one seal member. The recess may be a pocket, which may be milled in a surface of the substrate.

The recess may be at least partially formed on an outer surface of the substrate, which outer surface is presented to a seal surface external to the seal assembly in use. The recess may therefore define a volume for at least partially accommodating a seal member at the outer surface of the substrate, which may enable the seal member to be presented to a seal surface external to the seal assembly in use. The external surface to the seal assembly, may for example be an inner surface of a cylinder or bore.

The recess may be at least partially formed on an inner surface of the substrate, which inner surface is presented to a seal surface internal to the seal assembly in use. The recess may therefore define a volume for at least partially accommodating a seal member at the inner surface of the substrate, which may enable the seal member to be presented to a seal surface internal to the seal assembly in use. The internal surface to the seal assembly may for example an outer surface of a tubular, cylinder or mandrel on which it is assembled, or a conical or other wedge surface of the apparatus. The internal surface may be an actuating profile of the apparatus.

The recess may be at least partially formed on one or both of the first or second contact surfaces of the substrate, which contact surfaces may be presented to an adjacent element in the ring structure. The recess may therefore define a volume for at least partially accommodating a seal member at the first and/or second contact surfaces of the element, which may enable the seal member to be presented to an adjacent element.

In an embodiment, the recess may be continuous around two or more of the outer surface of the substrate, the inner surface of the substrate, and the first or second contact surfaces of the substrate. The recess may therefore define a volume for at least partially accommodating a seal member that is continuous around two or more of the outer surface of the substrate, the inner surface of the substrate, and the first or second contact surfaces of the substrate.

In a preferred embodiment, the recess is continuous around the outer surface of the substrate, the inner surface of the substrate, and the first or second contact surfaces of the substrate. The recess may therefore define a volume for at least partially accommodating a seal member that is continuous around the outer surface of the substrate, the inner surface of the substrate, and the first or second contact surfaces of the substrate.

The seal member may be formed to a first width and/or first volume on an outer surface of the substrate, which outer surface is presented to a seal surface external to the seal assembly in use. The seal member may be formed to a second width and/or second volume on an inner surface of the substrate, which inner surface is presented to a seal surface internal to the seal assembly in use. The second width may be less than the first width. Therefore there may be a greater volume of seal material on the outer surface, for presentation to the external surface (which may be of unknown condition, roundness and/or smoothness), than the volume of seal material presented to the internal surface (which may be of known condition, roundness and/or smoothness).

The seal member may comprise one or more surface formations, which may be configured to reduce friction between elements during expansion and/or collapsing. Alternatively, or in addition, the seal member may comprise one or more surface formations, which may be configured to facilitate energising the seal in use.

The surface formations may comprise one or more ridges or grooves, which may be oriented in planes perpendicular to the longitudinal axis of the ring structure.

The surface formations may comprise one or more ridges or grooves, which may be disposed on an outer surface of the seal member and element, and which may be oriented circumferentially on the ring structure.

The surface formations may comprise one or more ridges, which may be upstanding or proud from the surface of the element, and may be upstanding or proud from the surface of the substrate.

The surface formations may comprise one or more ridges or grooves, which may be disposed on a contact surface of the seal member and element.

The element may comprise first and second seal members, axially displaced on the substrate. The first and second seal members may be mirror image shapes. The substrate may be laterally asymmetric.

The ring structure may define a surface which is profiled, and/or may be provided with one or more functional formations thereon, for interacting with an auxiliary surface. An outer surface of the element may be provided with engaging means, which may be defined by a series of grooves and ridges in the outer surface. The elements may comprise slip elements, and the ring structure may be configured to provide an anchoring, retaining or hanging function.

The seal apparatus may comprise a formation configured to impart a radial expanding or collapsing force component to the elements of a ring structure from an axial actuation force. The apparatus may comprise a pair of formations configured to impart a radial expanding or collapsing force component to the elements of a ring structure from an axial actuation force. The formation (or formations) may comprise a wedge or wedge profile, and may comprise a cone wedge or wedge profile.

The elements may comprise side walls or flanks shaped to cooperate with the formation or formations configured to impart a radial expanding or collapsing force component to the seal elements. The formation or formations may define a wedge angle, and the side walls or flanks may define a flank angle corresponding to the wedge angle. The wedge angle may be in the range of 15 degrees to 75 degrees. The wedge angle may be selected from the group of wedge angles consisting of 30 degrees; 45 degrees or 60 degrees.

The apparatus may comprise a biasing means, which may be configured to bias the ring structure to one of its expanded or collapsed conditions. The biasing means may comprise a circumferential spring, a garter spring, or a spiral retaining ring. The biasing means may be arranged around an outer surface of a ring structure, to bias it towards a collapsed condition, or may be arranged around an inner surface of a ring structure, to bias it towards an expanded condition. One or more elements may comprise a formation such as a groove for receiving the biasing means. Preferably, grooves in the elements combine to form a circumferential groove in the ring structure. Multiple biasing means may be provided on the ring structure.

According to another aspect of the invention, there is provided an expanding and collapsing apparatus comprising:

a ring assembly comprising a plurality of elements assembled together to form a ring structure around a longitudinal axis;

wherein the ring structure is operable to be moved between an expanded condition and a collapsed condition by movement of the plurality of elements;

and wherein the plurality of elements is operable to be moved between the expanded and collapsed conditions by sliding with respect to one another along respective contact surfaces;

and wherein each of the plurality of elements is a compound element comprising a substrate and at least one seal member disposed on a part of a surface of the element.

Embodiments of the foregoing aspect of the invention may include one or more features of the first aspects of the invention or its embodiments, or vice versa.

According to a second aspect of the invention, there is provided a seal apparatus comprising:

a plurality of elements assembled together to form a ring structure around a longitudinal axis;

wherein the ring structure is operable to be moved between an expanded condition and a collapsed condition;

wherein in the expanded condition, the plurality of elements combine to form a solid seal ring structure having a substantially smooth outer surface;

and wherein each of the plurality of elements is a compound element comprising a substrate and at least one seal member disposed on a part of a surface of the element.

The substantially smooth surface may comprise a first surface portion configured for sealing with an external surface to the seal assembly, for example an inner surface of a cylinder or bore. The first surface portion may comprise an outer cylindrical surface. The substantially smooth surface may comprise a second surface portion configured for sealing with an internal surface to the seal assembly, for example an outer surface of a tubular, cylinder or mandrel on which it is assembled, or a conical or other wedge surface of the apparatus. The substantially smooth surface may comprise a third surface portion, also configured for sealing with an internal surface to the seal assembly, for example an outer surface of a tubular, cylinder or mandrel on which it is assembled, or a conical or other wedge surface of the apparatus. The first and second surfaces may be axially separated from one another.

The substantially smooth outer surface may comprise a smooth circular profile in a plane parallel to the plane of the ring structure. The substantially smooth outer surface may be substantially unbroken. Preferably, the smooth outer surface comprises one or more smooth side surfaces. The substantially smooth outer surface may comprise a smooth radially extending surface, and may comprise a first side of an annular projection defined by the ring structure in its expanded condition. The smooth surface may comprise a first side and an opposing second side of an annular projection defined by the ring structure in its expanded condition. Thus one or more flanks or faces of the ring structure, which are the surfaces presented in the longitudinal direction, may have smooth surfaces.

Embodiments of the second aspect of the invention may include one or more features of the first aspects of the invention or its embodiments, or vice versa.

According to a third aspect of the invention, there is provided an oilfield tool comprising the apparatus of any of the first or second aspects of the invention.

The oilfield tool may be a downhole tool. Alternatively, the oilfield tool may comprise a wellhead tool.

The downhole tool may comprise a downhole tool selected from the group consisting of a plug, a packer, an anchor, a tubing hanger, or a downhole locking tool.

The plug may be a bridge plug, and may be a retrievable bridge plug. Alternatively, the plug may be a permanent plug.

According to a fourth aspect of the invention, there is provided a downhole plug comprising the apparatus of any of previous aspects of the invention, and at least one additional expanding and collapsing ring structure disposed on an axial side of the apparatus.

The plug may comprise first and second additional expanding and collapsing ring structures, which may be disposed on opposing axial sides of the seal assembly.

The one or more additional expanding and collapsing ring structures may comprise a plurality of elements assembled together to form a ring structure around the longitudinal axis, and/or may be operable to be moved between an expanded condition and a collapsed condition by movement of the plurality of elements. The plurality of seal elements of the operable to be moved between the expanded and collapsed conditions by sliding with respect to one another along respective contact surfaces. The plurality of elements may each be formed from a harder material than the material from which the seal elements are formed, and may be formed from a metal, metal alloy, or composite material. The plurality of elements may be provided with one or more functional formations thereon, for interacting with an auxiliary surface.

The one or more additional ring structures may have one or more functions selected from the group of functions consisting of: anti-extrusion for the seal assembly, support for the seal assembly, or anchoring of the apparatus in a tubular or borehole.

The seal apparatus may comprise first and second additional expanding and collapsing ring structures, which may be disposed on opposing axial sides of the seal assembly.

Where the downhole plug comprises first and second additional expanding and collapsing ring structures, disposed on opposing axial sides of the seal assembly, the first additional expanding and collapsing ring structure may be an anchor ring structure or slip assembly for the downhole plug, and the second additional expanding and collapsing ring structure may be an anti-extrusion ring structure. Alternatively, both the first and second additional expanding and collapsing ring structures may be anchor ring structures or slip assemblies for the downhole plug. The anchor ring structures or slip assemblies for the downhole plug, may provide an anti-extrusion function for the seal assembly.

Embodiments of the fourth aspect of the invention may include one or more features of the first to third aspects of the invention or their embodiments, or vice versa.

According to a fifth aspect of the invention, there is provided a method of sealing a bore, the method comprising:

providing a seal assembly comprising a plurality of elements assembled together to form a ring structure around a longitudinal axis; wherein each of the plurality of elements is a compound element comprising a substrate and at least one seal member disposed on a part of a surface of the element;

imparting a force to the ring structure to move the plurality of elements by sliding with respect to one another; thereby moving the ring structure from a collapsed condition to an expanded condition.

Embodiments of the fifth aspect of the invention may include one or more features of the first to fourth aspects of the invention or their embodiments, or vice versa.

According to a sixth aspect of the invention, there is provided a method of releasing a seal in a bore, the method comprising:

providing a seal assembly comprising a plurality of elements assembled together to form a ring structure around a longitudinal axis; wherein each of the plurality of elements is a compound element comprising a substrate and at least one seal member disposed on a part of a surface of the element;

releasing or reducing a force from the ring structure to move the plurality of elements from a sealed condition by sliding with respect to one another, thereby moving the ring structure from an expanded condition to a collapsed condition.

Embodiments of the sixth aspect of the invention may include one or more features of the first to fifth aspects of the invention or their embodiments, or vice versa.

According to a seventh aspect of the invention, there is provided an expanding and collapsing apparatus comprising:

a plurality of elements assembled together to form a ring structure oriented in a plane around a longitudinal axis;

wherein the ring structure defines an inner ring surface configured to be presented to a surface of an object arranged internally to the ring structure;

wherein the ring structure is operable to be moved between an expanded condition and a collapsed condition by movement of the plurality of elements;

and wherein the plurality of elements is operable to be moved between the expanded and collapsed conditions by sliding with respect to one another;

wherein each of the plurality of elements is a compound element comprising a substrate and at least one seal member disposed on a part of a surface of the element.

The object may be an auxiliary object configured to extend through the ring structure.

The collapsed condition may be a first condition of the apparatus, and the expanded condition may be a second condition of the apparatus. Thus the apparatus may be normally collapsed, and may be actuated to be expanded. Alternatively, the expanded condition may be a first condition of the apparatus, and the collapsed condition may be a second condition of the apparatus. Thus the apparatus may be normally expanded, and may be actuated to be collapsed.

The expanding and collapsing apparatus may be configured to seal with an outer surface of an object, including but not limited to a tubular, a mandrel, a rod, drill pipe, a cable, or a wireline.

The expanding and collapsing apparatus may be a wireline valve.

One or more elements may comprise a port for injection of fluid into an internal volume of the ring structure.

Embodiments of the seventh aspect of the invention may include one or more features of the first to sixth aspects of the invention or their embodiments, or vice versa.

According to an eighth aspect of the invention, there is provided a method of forming a seal on an object, the method comprising:

providing an expanding and collapsing apparatus comprising:

a plurality of elements assembled together to form a ring structure oriented in a plane around a longitudinal axis; wherein each of the plurality of elements is a compound element comprising a substrate and at least one seal member disposed on a part of a surface of the element.

locating an object in a bore defined through the ring structure;

imparting or releasing a force to the ring structure to move the plurality of elements by sliding with respect to one another in the plane of the ring structure, thereby moving the ring structure from an expanded condition to a collapsed condition.

The object may be selected from a tubular, a mandrel, a rod, drill pipe, a cable, or a wireline.

Embodiments of the eighth aspect of the invention may include one or more features of the first to seventh aspects of the invention or their embodiments, or vice versa.

BRIEF DESCRIPTION OF THE DRAWINGS

There will now be described, by way of example only, various embodiments of the invention with reference to the drawings, of which:

FIGS. 14A and 14B are schematic views of the locking tool of FIGS. 13A and 13B in an expanded condition;

DETAILED DESCRIPTION OF PREFERRED EMBODIMENTS

Figure 1A:
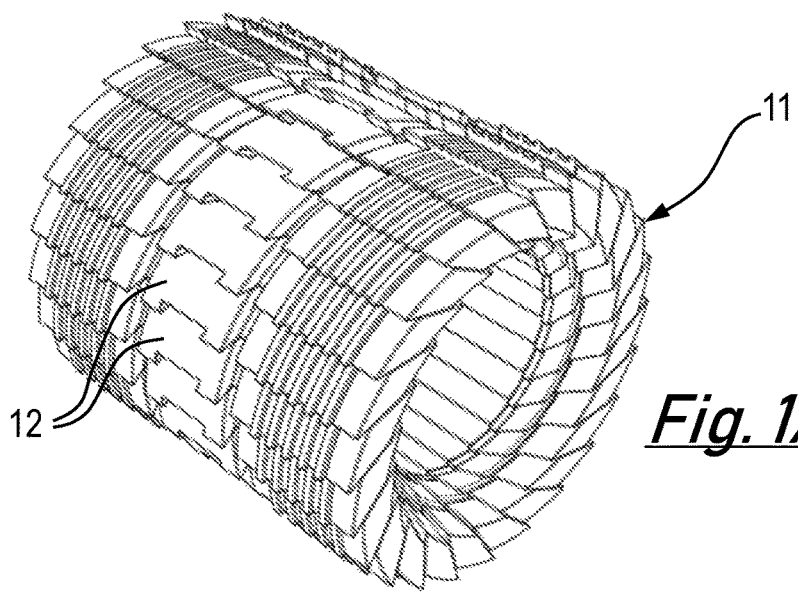
FIGS. 1A to 1E are views of a seal apparatus according to a first embodiment of the invention in a collapsed condition.
Figure 1B:
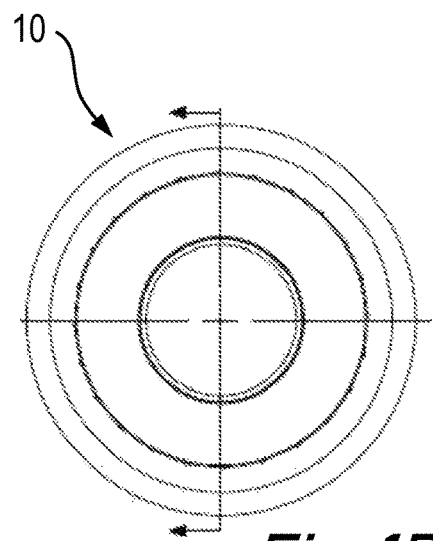
Figure 1C:
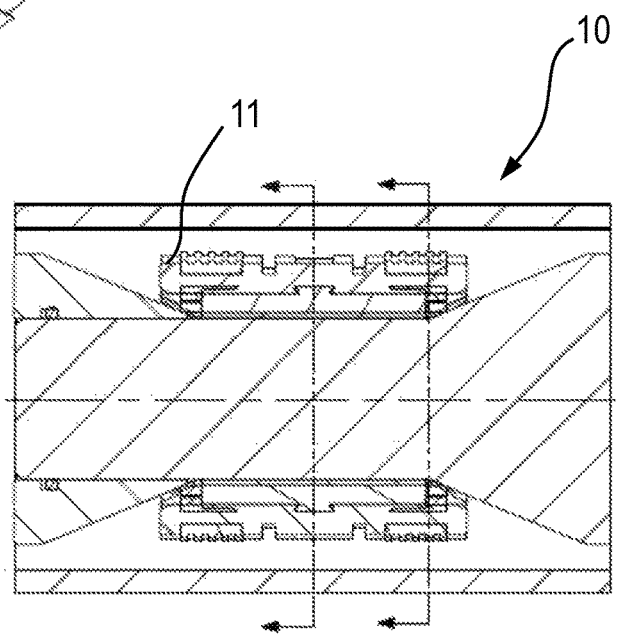
Figure 1D:
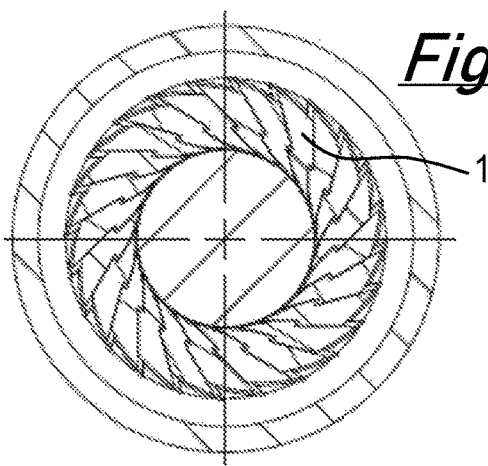
Figure 1E:
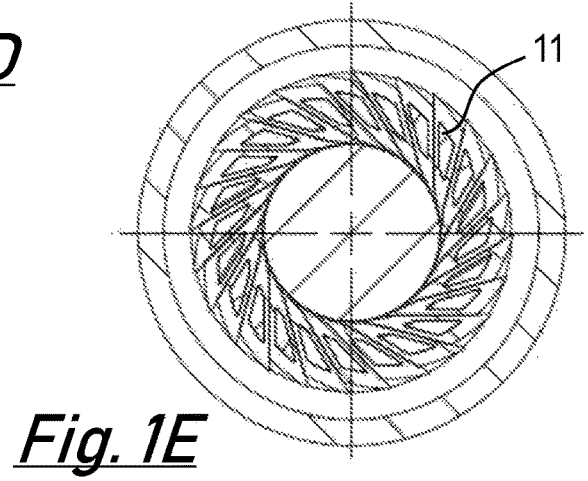
Figure 2A:
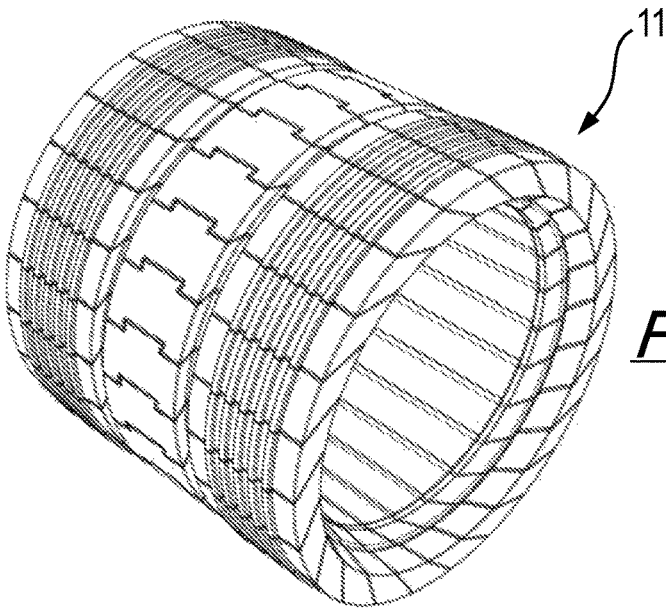
FIGS. 2A to 2E are views of the seal apparatus of FIGS. 1A to 1E in an expanded condition.
Figure 2B:
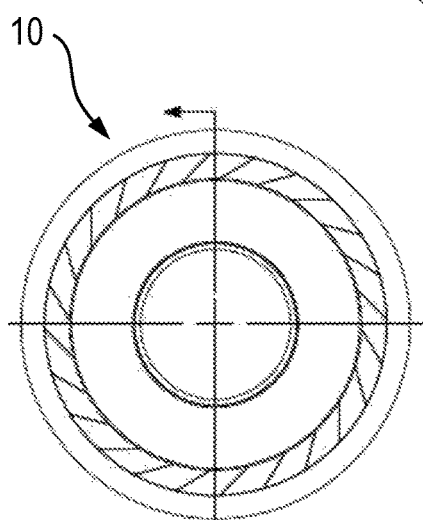
Figure 2C:
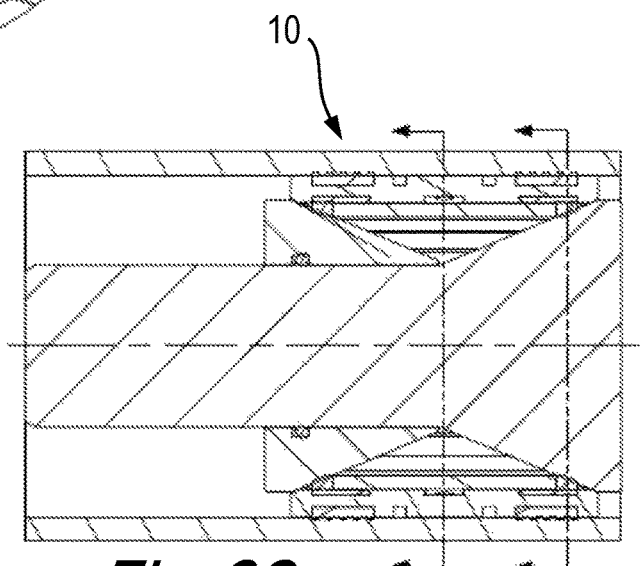
Figure 2D:
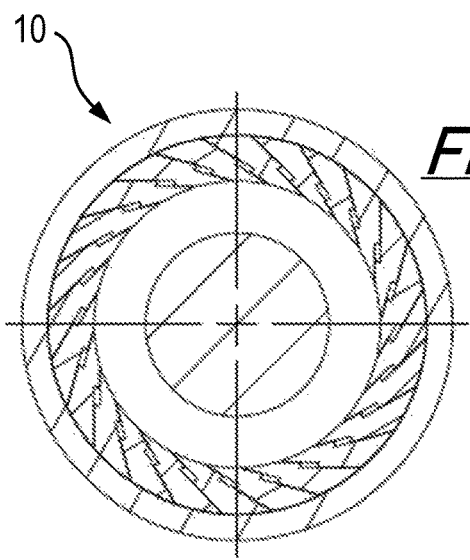
Figure 2E:
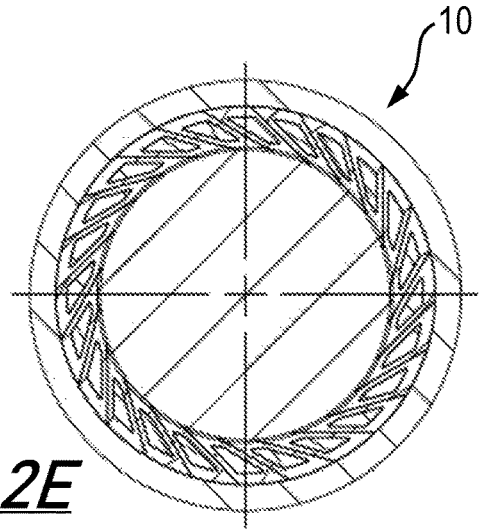

Referring firstly to FIGS. 1 to 7, the principles of the invention will be described with reference to a seal apparatus in accordance with a first embodiment. In this embodiment, the seal apparatus, generally depicted at 10, comprises a seal ring structure configured to be expanded from a first collapsed or unexpanded condition (shown in FIGS. 1A to 1E) and a second expanded condition (shown in FIGS. 2A to 2E). The apparatus of this and other embodiments may be referred to as "expanding seal apparatus" for convenience, as they are operable to move to an expanded state from a normal collapsed state. However, the apparatus may equally be referred to as a collapsing seal apparatus, or an expanding or collapsing seal apparatus, as it is capable of being expanded or collapsed depending on operational state.

The seal apparatus 10 comprises a plurality of compound elements 12 assembled together to form a ring structure 11. The compound elements 12 define an inner ring surface which is configured to be supported by the outer surface of cylinder in use. Each seal element comprises an inner surface 20, an outer surface 21 and first and second contact surfaces 22, 23. The first and second contact surfaces are oriented in non-parallel planes, which are tangential to a circle centred on the longitudinal axis L-L' of the apparatus. The planes converge towards the inner surface of the element. Therefore, each element is in the general form of a wedge, and the wedges are assembled together in a circumferentially overlapping fashion to form the ring structure 11. In use, the first and second contact surfaces of adjacent elements are mutually supportive.

When the seal ring structure is expanded to its optimal outer diameter, the orientation planes of the first and second contact surfaces intersect an inner surface of the seal ring structure, and together with the longitudinal axis of the apparatus, the lines of intersection define a sector of a cylinder. In this case, the ring structure is formed from twenty-four identical elements, and the central angle $\theta_1$ is 15 degrees. The angle described between the orientation planes of the first and second contact surface is the same as the central angle of the cylindrical sector, so that the elements are arranged rotationally symmetrically in the structure.

Figure 3A:
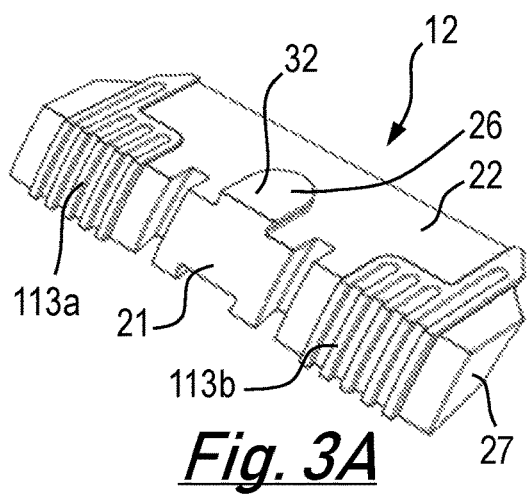
FIGS. 3A and 3B are views of an element of the seal apparatus of FIGS. 1A to 1E.
Figure 3B:
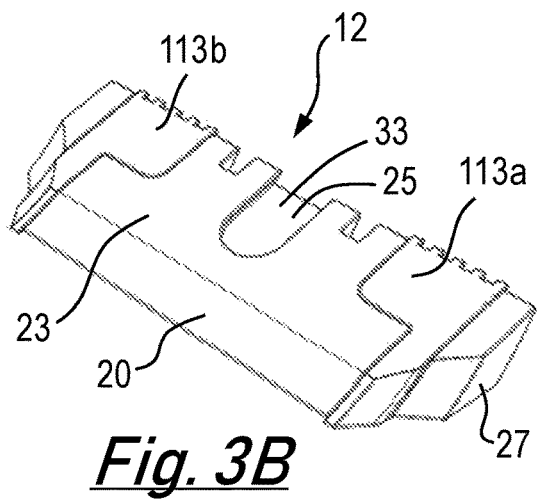
Figure 4A:
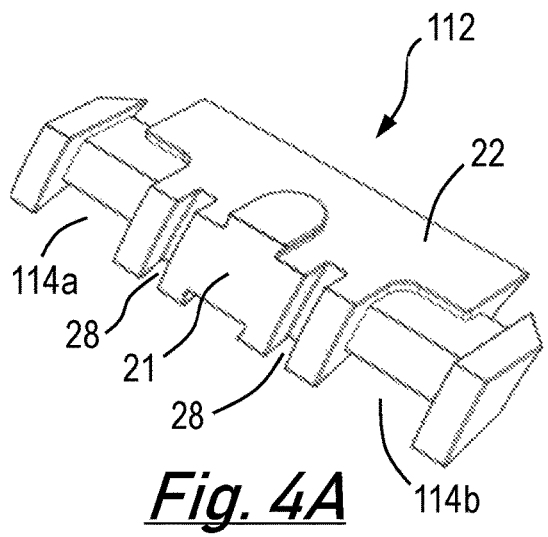
FIGS. 4A and 4B are views of a substrate of an element of the seal apparatus of FIGS. 1A to 1E.
Figure 4B:
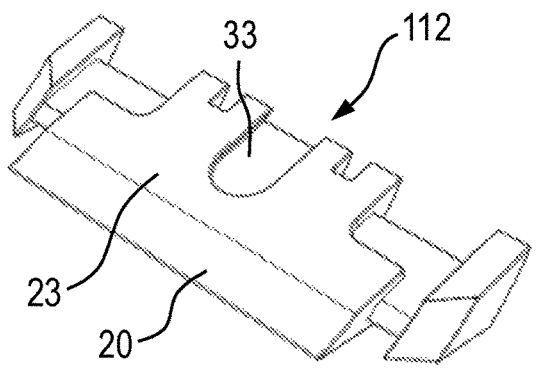
Figure 5A:
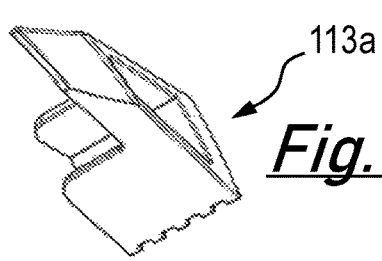
FIGS. 5A to 5D are views of a substrate of seal member of the seal apparatus of FIGS. 1A to 1E.
Figure 5C:
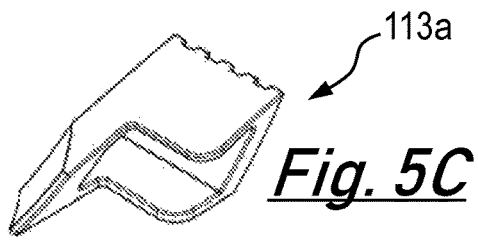
Figure 5B:
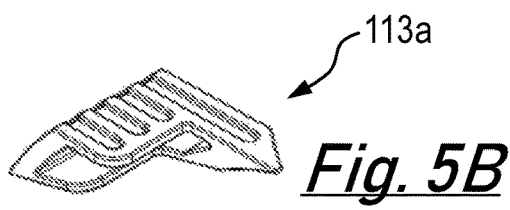
Figure 5D:
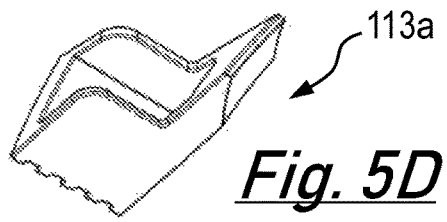

As shown in FIGS. 3A and to 5D, the compound elements are formed from a substrate 112 and a pair of seal members 113a, 113b (together 113) disposed on the surface of the element. The seal member is formed from a compliant, compressible or resilient material, which in this embodiment is Hydrogenated Nitrile Butadiene Rubber (HNBR), and are formed by an injection moulding process. It will be appreciated that other compliant, compressible or resilient materials may be used in alternative embodiments of the invention, and the material may be selected in dependence on the conditions to be experienced in use. For example, the seal members may be formed from a fluoroelastomer, fluoropolymer or fluoro rubber, which may for example be an FKM or FPM such as the FPM manufactured by or under license from DuPont Performance Elastomers and designated by the registered trade mark VITON®. Alternatively, or in addition, the seal members may be formed from a fluoroelastomer based upon an alternating copolymer of tetrafluoroethylene and propylene rubber, such as the fluoropolymer manufactured by or under license from Asahi Glass Co., Ltd and designated by the registered trade mark AFLAS®. Other methods for forming the seal members may be used, including but not limited to three-dimensional printing, casting, machining, or combinations of the above processes.

The substrate 112 is formed from a material with greater rigidity and/or hardness than the material of the seal member 113, which in this embodiment is steel.

The first and second contact surfaces of the seal elements have corresponding interlocking profiles 24 formed therein, such that adjacent elements can interlock with one another. In this case, the interlocking profiles comprise a dovetail groove 25 and a corresponding dovetail tongue 26. The interlocking profiles resist circumferential and/or radial separation of the elements in the ring structure, but permit relative sliding motion between adjacent elements. The interlocking profiles also facilitate smooth and uniform expansion and contraction of the elements during use. It will be appreciated that alternative forms of interlocking profiles, for example comprising recesses and protrusions of other shapes and forms, may be used within the scope of the invention.

The elements are also provided with inclined side wall portions 27, which may facilitate deployment of the apparatus in use. The side wall portions are formed in an inverted cone shape which corresponds to the shape and curvature of actuating cone wedges profiles when the apparatus is in its maximum load condition (typically at its optimum expansion condition).

Each element is also provided with a pair of grooves 28, and in the assembled ring structure, the grooves are aligned to provide a circular groove which extends around the ring. Each groove accommodates a biasing element (not shown), for example a spiral retaining ring of the type marketed by Smalley Steel Ring Company™ under the Spirolox™ brand, or a garter spring. In this case, the biasing means is located around the outer surface of the elements, to bias the apparatus towards the collapsed condition shown in FIGS. 1A to 1E. Although two grooves for accommodating a biasing means is provided in this embodiment, in alternative embodiments of the apparatus, a single groove, or a number of grooves greater than two, may be provided with corresponding biasing means.

The apparatus 10 of this embodiment is configured for actuation by an axial force from a wedge member, which in this case is in the form of an annular ring having a conical surface opposing one side of the ring structure 11. The wedge angle corresponds with the angle of the inclined conical side walls or flanks 27 of the elements. In this case the angle described between the conical side walls or flanks and the longitudinal axis of the ring is 30 degrees, although other angles may be selected depending on application. In alternative embodiments of the invention a wedge may be substituted with an abutment shoulder.

Figure 6:
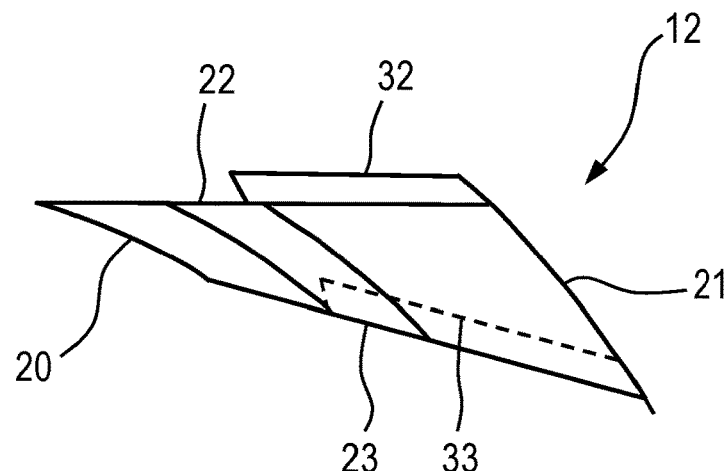
FIGS. 6 and 7 are geometric representations of an element of the apparatus of FIGS. 1A to 1E, shown from one side.
Figure 7:
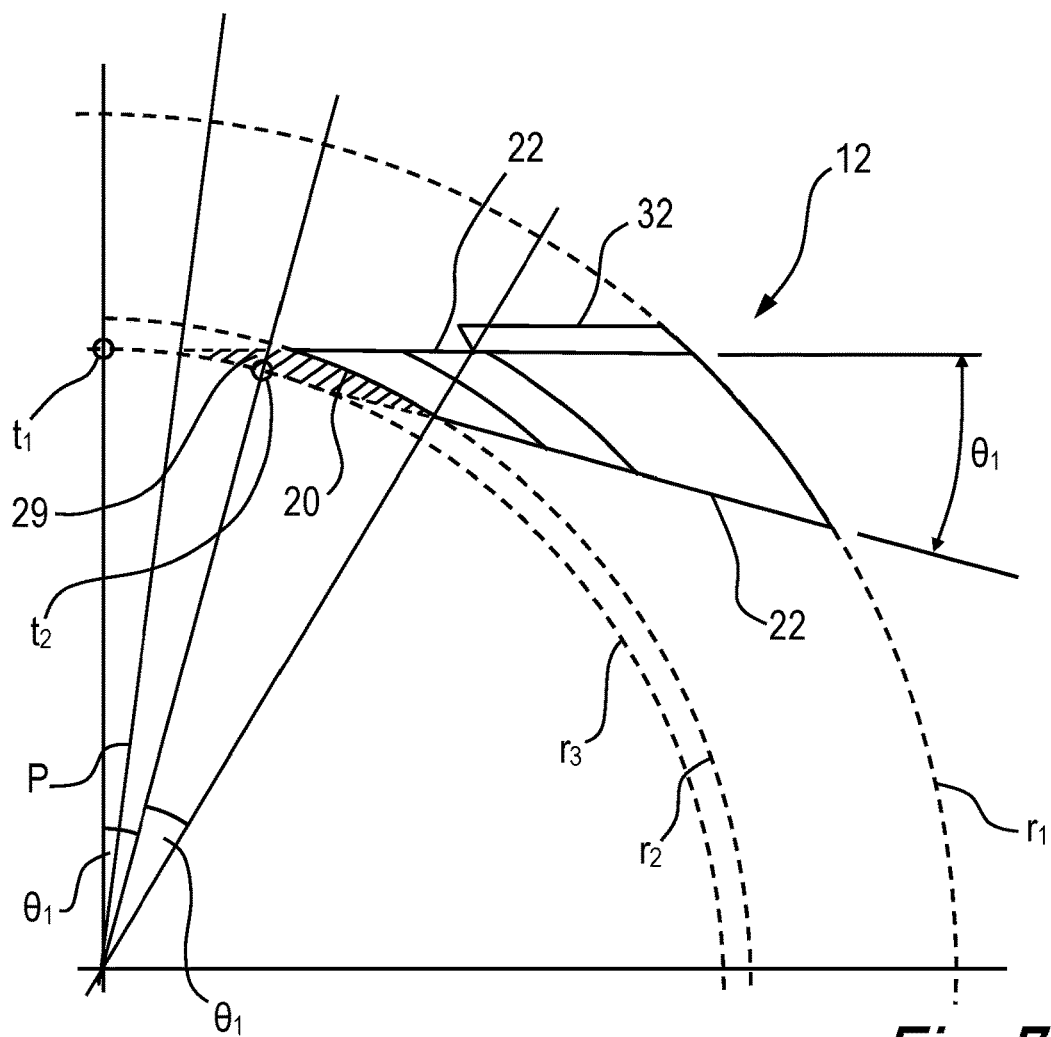
Figure 8A:
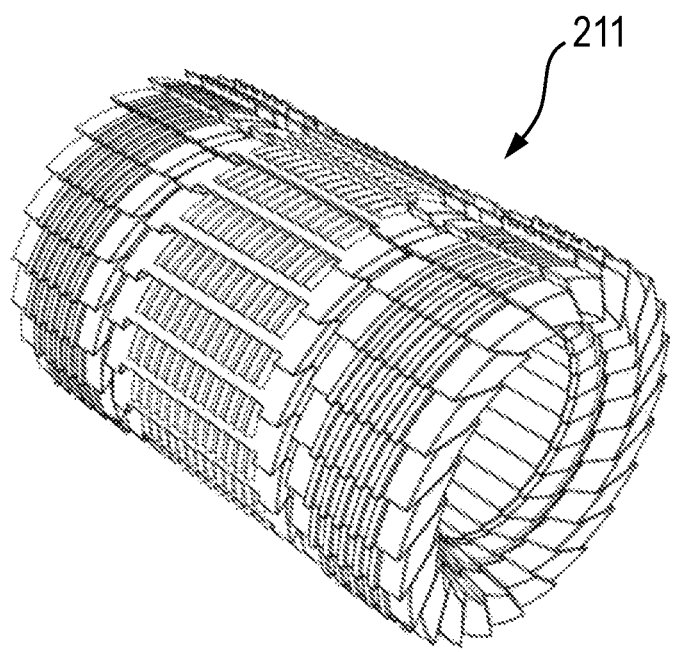
FIGS. 8A and 8B are views of a seal apparatus according to an alternative embodiment of the invention in a collapsed condition.
Figure 8B:
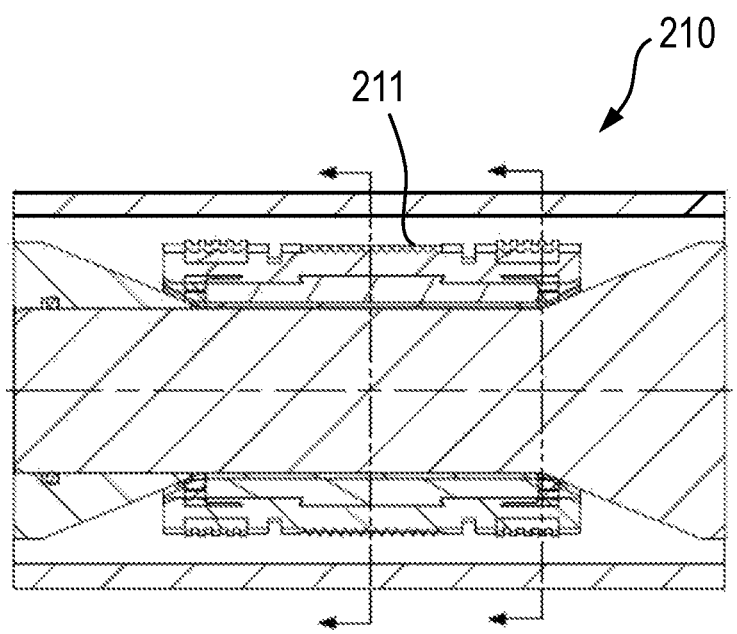
Figure 9A:
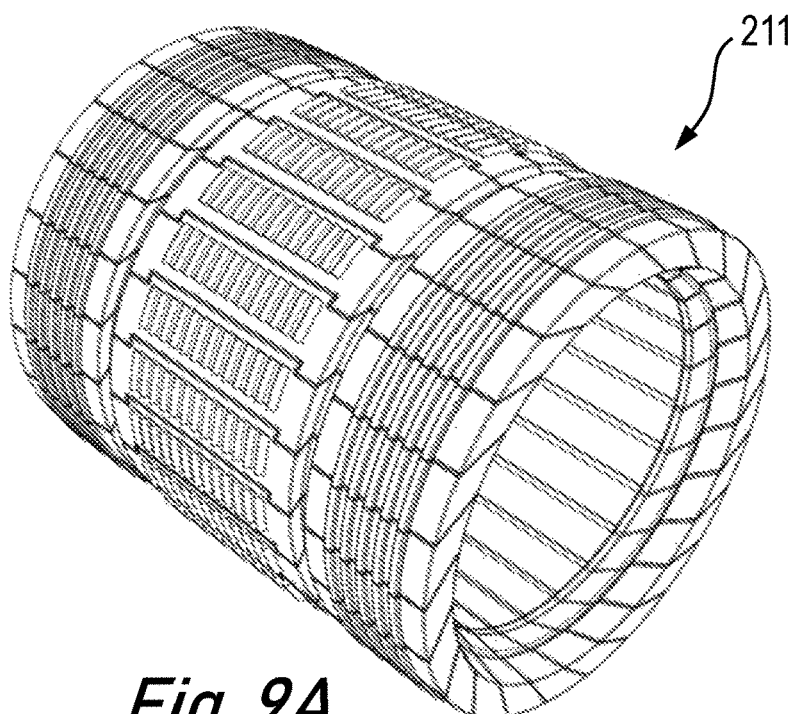
FIGS. 9A and 9B are views of the seal apparatus of FIGS. 8A and 8B in an expanded condition.
Figure 9B:
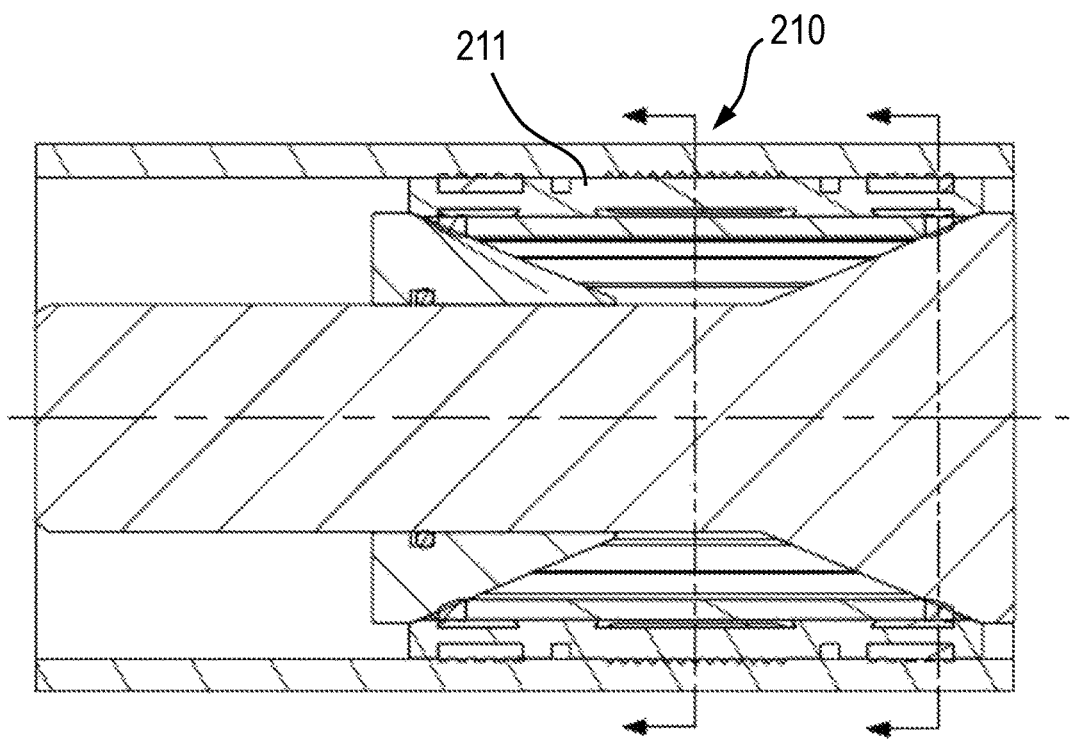
Figure 10:
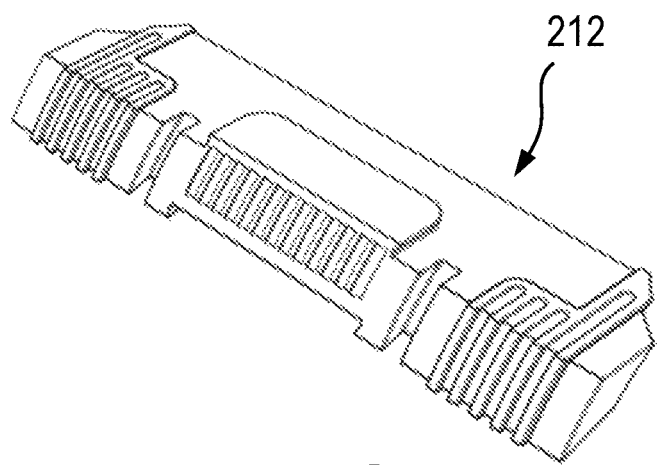
FIG. 10 is an isometric view of an element of the seal apparatus of FIGS. 8A and 8B.

As shown in FIGS. 6 and 7, each element 12 is based on a notional wedge-shaped segment of a ring centred on an axis, with each notional wedge-shaped segment being inclined with respect to the radial direction of the ring. The nominal outer diameter of the segment is at the optimum expansion condition of the ring (with radius shown at $r_1$).

Taking the first and second contact surfaces 22, 23 as the primary defining surfaces (i.e. ignoring for now the surfaces created by the dovetail tongue and groove), the orientation planes of the surfaces of the element are tangential to a circle with radius $r_3$ and concentric with the ring at tangent points $t_1$, $t_2$. The angle described between the tangent points is equal to the angle $\theta_1$ of the segment. The orientation planes of the surfaces of each notional wedge-shaped segment intersect one another on a radial plane P which bisects radial planes located at the tangent points (i.e. is at an angle of $\theta_1/2$ to both). This intersection plane P defines the expanding and collapsing path of the segment.

In the present embodiment, notional wedge-shaped segments are modified by removal of material 29 from the main body of the wedge at its tip, to provide a curved or arced inner surface 20 with radius $r_2$ when the ring is in its expanded condition shown in FIGS. 1A to 10. The modification of the wedge-shaped elements can be thought of as an increase in diameter of an internal bore through the ring structure by $2(r_2-r_3)$, or a truncation of the inner diameter. This change in the inner diameter from the notional inner diameter $r_3$ to which the contact surfaces are tangential, to a truncated inner diameter $r_2$, has the effect of changing an angle between the contact surfaces and the radial plane from the centre of the ring. Taking angle $\theta_2$ to be the angle described between the contact surface and a radial plane defined between the centre point of the ring structure and the point at which the orientation surface meets or intersects a circle at the radial position of the inner surface, $\theta_2$ is changed in dependence on the amount by which the segment has its inner diameter truncated. For the notional wedge-shaped segment, the orientation planes of the contact surfaces are tangential to a circle at the inner diameter at $r_3$ (i.e. angle $\theta_2$ is 90 degrees). For the modified elements 12, the orientation planes of the contact surfaces instead intersect a circle at the (increased) inner diameter at $r_2$, and are inclined at a reduced angle $\theta2$.

The angle $\theta_2$ at which the segment is inclined is related to the amount of material removed from the notional wedge-shaped segment, but is independent from the central angle $\theta_1$ of the wedge. Angle $\theta_2$ is selected to provide element dimensions suitable for manufacture, robustness, and fit within the desired annular volume and inner and outer diameters of the collapsed ring. As the angle $\theta_2$ approaches 90 degrees, a shallower, finer wedge profile is created by the element, which may enable optimisation of the collapsed volume of the ring structure. Although a shallower, finer wedge profile may have the effect of reducing the size of the gaps created at the inner surface of the ring in the collapsed condition and/or enabling a more compact collapsed condition, there are some consequences. These include the introduction of flat sections at the inner surfaces of the elements, which manifest as spaces at the inner diameter of the ring when in an expanded or partially expanded condition. When $\theta_2$=90 degrees, all the segments are purely tangential to inner diameter, the collapsed volume for a given outer diameter and inner diameter is most efficient, but the inner surface of the ring structure is polygonal with flat sections created by each segment. In some configurations, these flat sections may be undesirable. There may also be potential difficulties with manufacture of the elements and robustness of the elements and assembled ring structure. However, in many applications, where the profile of the inner surface of the expanded ring is not critical, for example when the inner diameter of the ring structure is floating, and/or the true inner diameter is defined by an actuation wedge profile rather than the inner surface of the ring, this compromise may not be detrimental to the operation of the apparatus, and the reduced collapse volume may justify an inclination angle $\theta_2$ of (or approaching) 90 degrees.

In the apparatus of FIGS. 1 to 6, the angle $\theta_2$ is 75 degrees. Relaxing $\theta_2$ to a reduced angle provides a smooth outer diameter and inner diameter profile on the main contact surfaces the expanded ring, as a portion of the inner circular arc is retained at the expense of slightly increased collapsed volume. It should be noted that the angle $\theta_2$ is independent from the angle $\theta_1$. Where the ring structure is desired to have a circular inner surface, preferred arrangements may have an angle $\theta_2$ which is in the range of (90 degrees-$2\theta_1$) to 90 degrees inclusive, and particularly preferred arrangements have an angle $\theta_2$ in the range of 70 degrees to 90 degrees (most preferably in the range of 73 degrees to 90 degrees). In general, to provide sufficient truncation of the inner diameter to retain a useful portion of an inner arc and provide a smooth inner surface to the ring structure, a maximum useful value of $\theta_2$ is (90 degrees-$\theta_1/2$). This would be 82.5 degrees in the described arrangements.

In this application, the main contact surfaces 22, 23 on opposing lateral sides of a central axis of the element are designed to create a seal with an inner actuating surface in the optimal expanded condition, and it is therefore advantageous for the seal elements to be truncated to a reduced inner diameter so that smooth, circular inner surfaces are formed on either side of the expanded seal ring to avoid uneven stresses in the seal elements.

The substrate 112 defines the outer side walls or flanks of the elements 112. The substrate comprises a pair of axially separated recesses on which define volumes to receive at least a part of seal members 113*a*. The recess is in the form of a pocket, milled in a surface of the substrate. The recess is continuous around the outer surface of the substrate, the inner surface of the substrate, and the first or second contact surfaces of the substrate. The recess therefore defines a volume for accommodating a seal member that is continuous around the substrate.

The geometry of the seal members 113*a*, 113*b* corresponds generally to the geometry of the substrate 112.

The seal members are formed to a first width on an outer surface of the substrate, which is presented to a seal surface external to the seal assembly in use. The seal member is formed to a second width on an inner surface of the substrate, which is presented to a seal surface internal to the seal assembly in use. The second width is less than the first width, so that there is a greater volume of seal material on the outer surface, for presentation to the external surface (which may be of unknown condition, roundness and/or smoothness), than the volume of seal material presented to the internal surface (which may be of known condition, roundness and/or smoothness).

The recess on the contact surfaces is shaped to provide a transition between the first and second widths. This transition is shaped to facilitate energising the seal in use by "lifting" the seal member axially into and radially outward of the ring structure.

Each seal member comprises ridges or grooves, which are upstanding or proud from the surface of the element and the surface of the substrate. Ridges and grooves on the outer surface of the element facilitate energising the seal in use. Ridges and grooves between the contact surfaces help to reduce friction between elements during expansion and/or collapsing.

In other configurations, also in accordance with embodiments of the invention (and as will be described below) the geometry of the notional wedge-shaped segments forming the elements may be varied, with different lateral portions of the seal element being truncated to provide a smooth expanded inner diameter for the creation of an internal sealing surface. Indeed, there may be no requirement for the ring structure to have a circular inner surface in some embodiments, depending on the material selection (for example hardness) and sealing applications.

Operation of the expansion apparatus will now be described. In the first, collapsed or unexpanded condition, shown most clearly in FIG. 10, the elements are assembled in a ring structure 11 which extends to a first outer diameter. The elements are biased towards the unexpanded condition by spiral retaining springs, and in use would be supported on their inner surface by the outer surface of a cylinder or mandrel.

In use, an axial actuation force is imparted on a wedge member. Any of a number of suitable means known in the art can be used for application of the axial actuation force, for example, the application of a force from an outer sleeve positioned around a base cylinder. The force causes the wedge member to move axially with respect to the cylinder, and transfer a component of the axial force onto the recessed side wall of the elements. The angle of the wedge transfers a radial force component to the elements 12, which causes them to slide with respect to one another along their respective contact surfaces.

The movement of the expanding elements is tangential to a circle defined around the longitudinal axis of the apparatus. The contact surfaces of the elements mutually support one another before, during, and after expansion. The radial position of the elements increases on continued application of the axial actuation force until the elements are located at a desired outer radial position. This radial position may be defined by a controlled and limited axial displacement of the wedge member, or alternatively can be determined by an inner surface of a bore or tubular in which the apparatus is disposed.

FIGS. 2A to 2E show the apparatus in its expanded condition. At an optimal expansion condition, shown in FIG. 2B, the outer surfaces of the individual elements combine to form a complete circle with no gaps in between the individual elements. The outer surface of the expansion apparatus can be optimised for a specific diameter, to form a perfectly round expanded ring (within manufacturing tolerances) with no gaps on the inner or outer surfaces of the ring structure. The design of the expansion apparatus also has the benefit that a degree of under expansion or over expansion (for example, to a slightly different radial position) does not introduce significantly large gaps.

The inner surface of the expanded ring structure, and in particular the inner circular surfaces created by the seal members at the truncated inner contact surfaces laterally outward of the interlocking formations, create a seal with the actuation wedges in use. The seal apparatus therefore seals on both its outside surface and its inner surface, and is capable of sealing an annular space between a base pipe or mandrel and an outer surface. The apparatus forms an effective hybrid seal from the compound elements.

Release or reduction of the actuating force on the seal apparatus results in a reversal of the movement of the elements, aided by the biasing springs. The seal elements slide tangentially with respect to one another along their respective contact surfaces, and the contact surfaces of the elements mutually support one another before, during, and after collapsing. Satisfactory retraction of the elements is facilitated by the absence of stresses and strains on the elements during deployment.

It is a feature of the invention that the elements are mutually supported before, throughout, and after the expansion, and do not create gaps between the individual elements during expansion or at the fully expanded position. In addition, the arrangement of elements in a circumferential ring, and their movement in a plane perpendicular to the longitudinal axis, facilitates the provision of smooth side faces or flanks on the expanded ring structure. With deployment of the elements in the plane of the ring structure, the overall width of the ring structure does not change. This enables use of the apparatus in close axial proximity to other functional elements.

An alternative embodiment of the invention is described with reference to FIGS. 8A to 10. The seal apparatus 210 is similar to the seal apparatus 10, and will not be described in detail, but will be understood from FIGS. 1 to 7 and the accompanying description. The individual compound elements 212 of the seal apparatus 10 are similar to the elements 12, and comprise inner and outer surfaces and first and second contact surfaces. The first and second contact surfaces are oriented in non-parallel planes, which are tangential to a circle centred on the longitudinal axis of the apparatus. The elements 212 also comprise corresponding interlocking profiles. Each compound element 212 is similar in form and function to the elements 12, and their operation will be understood from the foregoing description. However, the compound elements 212 differ in that their substrates are axially extended and the outer surface of each element 212 is provided with engaging means defined by a series of grooves and ridges in the outer surface, disposed on either side of retaining ring grooves. In this embodiment, the slip elements 212 are bidirectional to provide an anchoring force which resist movement in both upward and downward directions.

The apparatus therefore defines a sealing slip assembly, with sealing and anchoring/engaging functionality. The apparatus 210 may be used, for example, in downhole packer and plug applications.

In one example application, the apparatus of the invention is implemented in a retrievable bridge plug. A retrievable bridge plug is a downhole tool which is located and set to isolate a part of the wellbore, in a way that enables it to be unset and retrieved from the wellbore after use. A typical retrievable bridge plug includes an arrangement of slips for anchoring the plug in the well, and a seal element for creating a fluid seal. An unsupported seal assembly may have a tendency to deform and fail through an extrusion gap between the maximum outer diameter of a gauge ring which supports the seal and the surrounding bore to which the seal element has been expanded. The seal apparatus 10 may replace an anti-extrusion ring of a conventional plug, and/or the seal apparatus 210 may replace a slip assembly of a conventional plug, providing additional supplemental seals.

Alternatively the seal apparatus 210 may provide combined sealing and anchoring functionality.

Figure 11A:
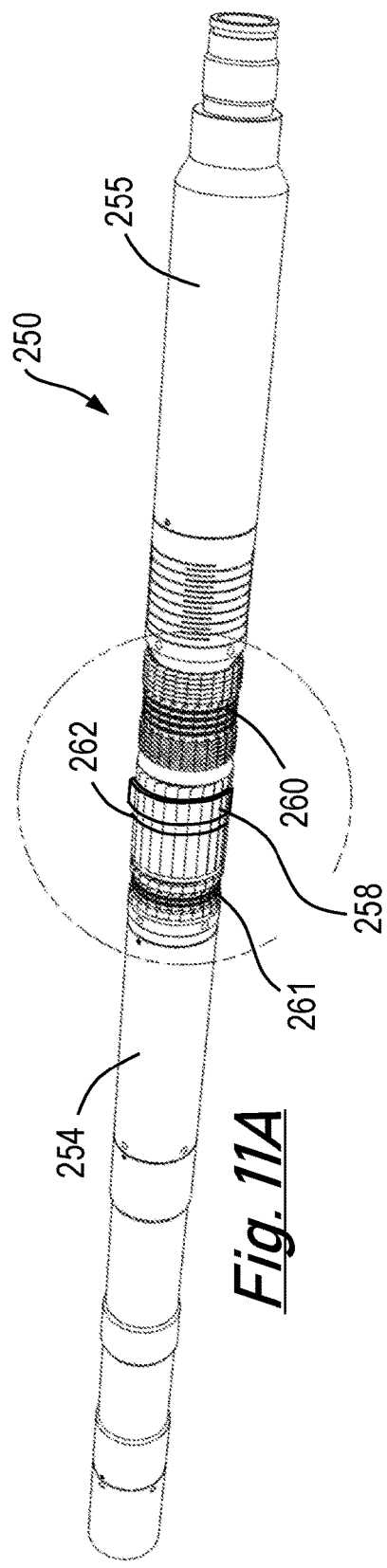
FIGS. 11A and 11B are views of a seal apparatus applied to a downhole plug according to an alternative embodiment of the invention in a collapsed condition.
Figure 11B:
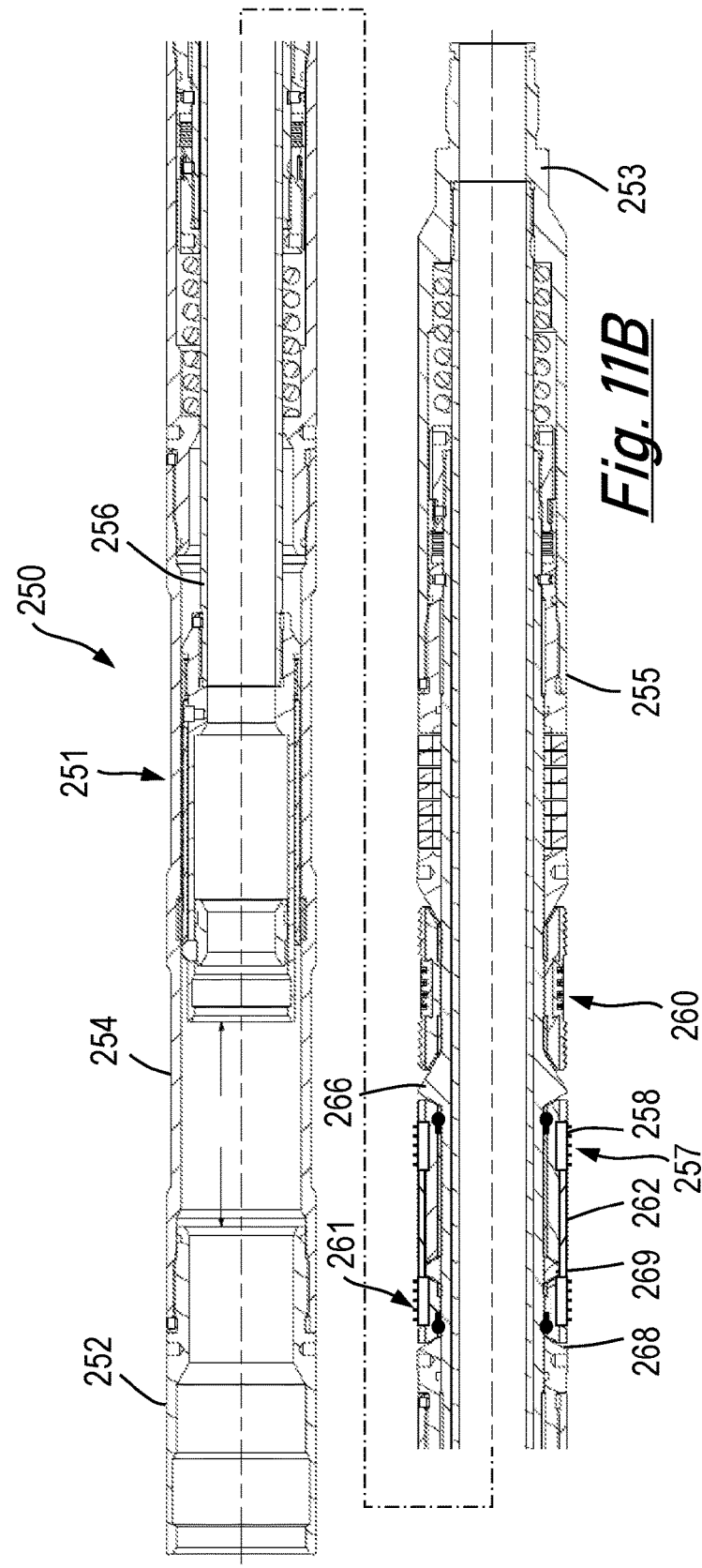
Figure 12:
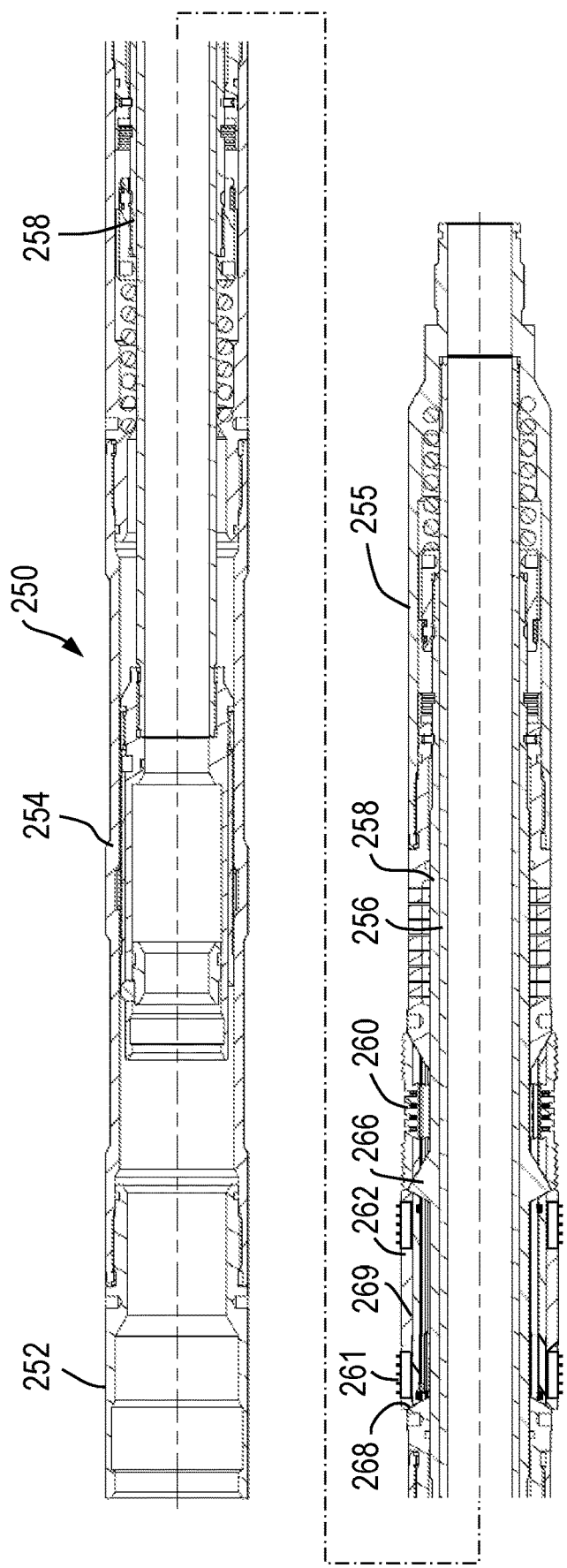
FIG. 12 is a view of the downhole plug of FIGS. 11A and 11B in an expanded condition.

An example of a retrievable bridge plug application is described with reference to FIGS. 11A to 12. FIGS. 11A and 11B are respectively perspective and sectional views through a retrievable bridge plug incorporating apparatus according to an embodiment of the invention, shown in a run position, and FIG. 12 is a sectional view of the apparatus of FIGS. 11A and 11B, shown in a set position.

The plug, generally depicted at 250 comprises a housing assembly 251, and upper and lower connectors 252, 253 for connecting the plug into a tool string. The housing assembly 251 comprises upper and lower housing subs 254, 255 located on a mandrel 256 on either side of a seal and anchor assembly 257. An actuation sleeve 258 connects the upper and lower housing subs on the mandrel. The plug is generally similar the plug described in the applicants' co-pending WO2017/109506 (incorporated herein by reference), comprising an expanding ring of elements configured in a slip assembly 260. However, the plug 250 differs in the nature of the seal assembly. Plug 250 has a seal apparatus 257 in accordance with the present invention, comprising a seal assembly 262 formed from a plurality of compound seal elements assembled into a ring structure. The seal apparatus is similar to the seal apparatus 11, and will be understood from the foregoing description. The compound seal elements are formed from a substrate 269 and seal members 258, 261 disposed on the surface of the substrate. When actuated by an axial actuation force imparted on the wedge members 266, 268, the wedge transfers a radial force component to the elements which causes them to slide with respect to one another along their respective contact surfaces. The inner surface of the expanded ring structure, and in particular the inner circular surfaces created by the seal members at the truncated inner contact surfaces laterally outward of the interlocking formations, create a seal with the actuation wedges in use. The seal apparatus therefore seals on both its outside surface and its inner surface, and is capable of sealing the annular space between a base pipe or mandrel and an outer surface, in the position shown in FIG. 12.

This application of the invention provides a means of combining anti-extrusion and sealing functionality into a single expanding assembly, in contrast with conventional bridge plugs which require separate sealing and anti-extrusion devices.

The invention also has benefits in creating a seal and/or filling an annular space, and an example application will be described with reference to FIGS. 13A to 14B, in which the invention is applied to a downhole locking tool. A typical locking tool uses one or more radially expanding components deployed on a running tool. The radially expanding components engage with a pre-formed locking profile at a known location in the wellbore completion. A typical locking profile and locking mechanism includes a recess for mechanical engagement by the radially expanding components of the locking tool. A seal bore is typically provided in the profile, and a seal on the locking tool is designed to seal against the seal bore. The present embodiment of the invention provides benefits over conventional locking mechanisms as will be apparent from the description below.

Figure 13A:
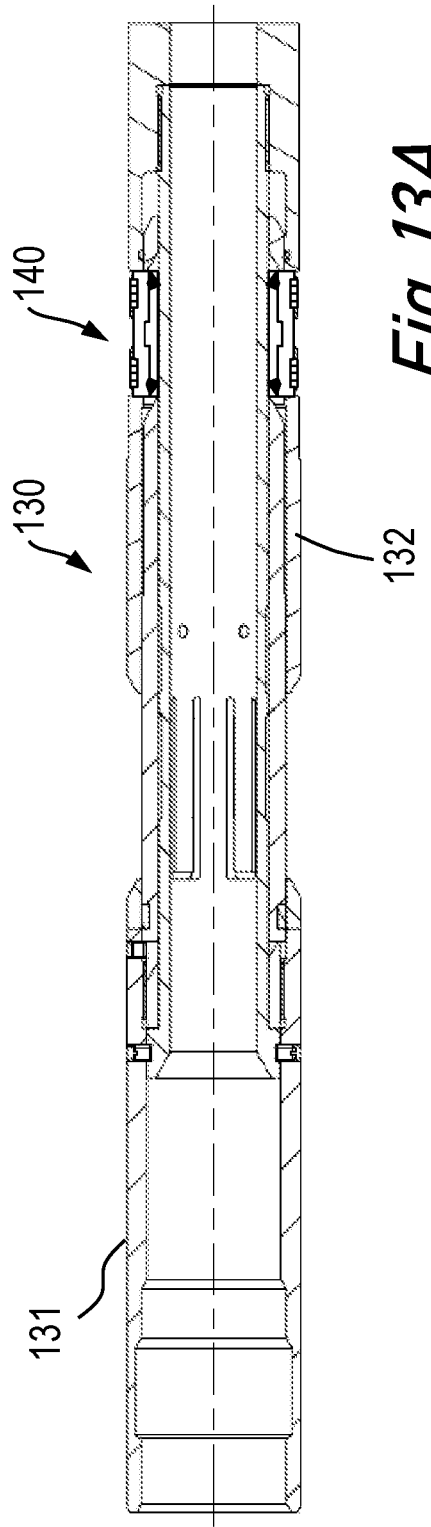
FIGS. 13A and 13B are schematic views of a seal apparatus applied to a downhole locking tool according to an alternative embodiment of the invention in a collapsed condition.
Figure 13B:
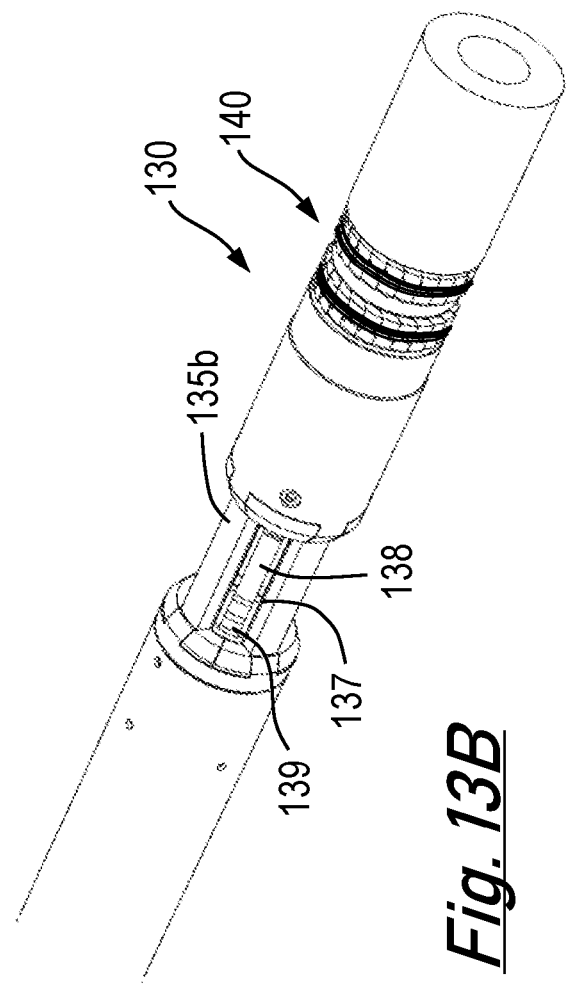
Figure 15A:
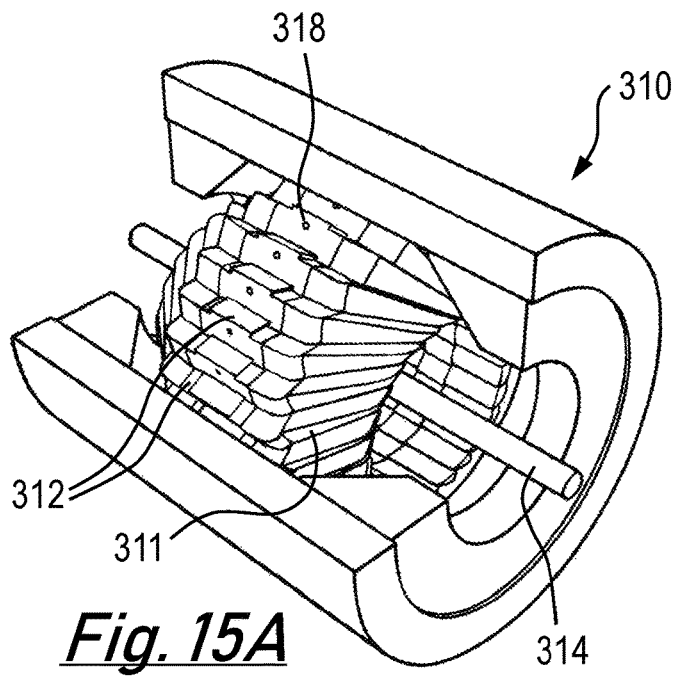
FIGS. 15A to 15D are schematic views of a seal apparatus applied to a wireline valve according to an alternative embodiment of the invention in an expanded condition.
Figure 15B:
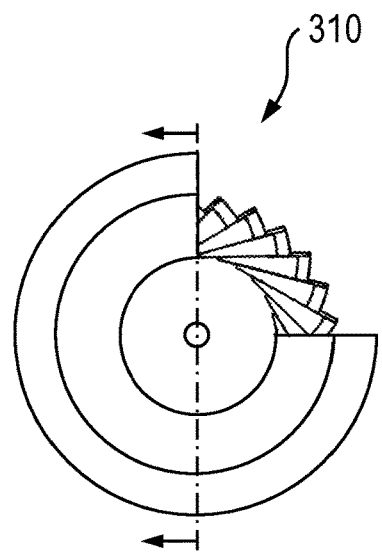
Figure 15C:
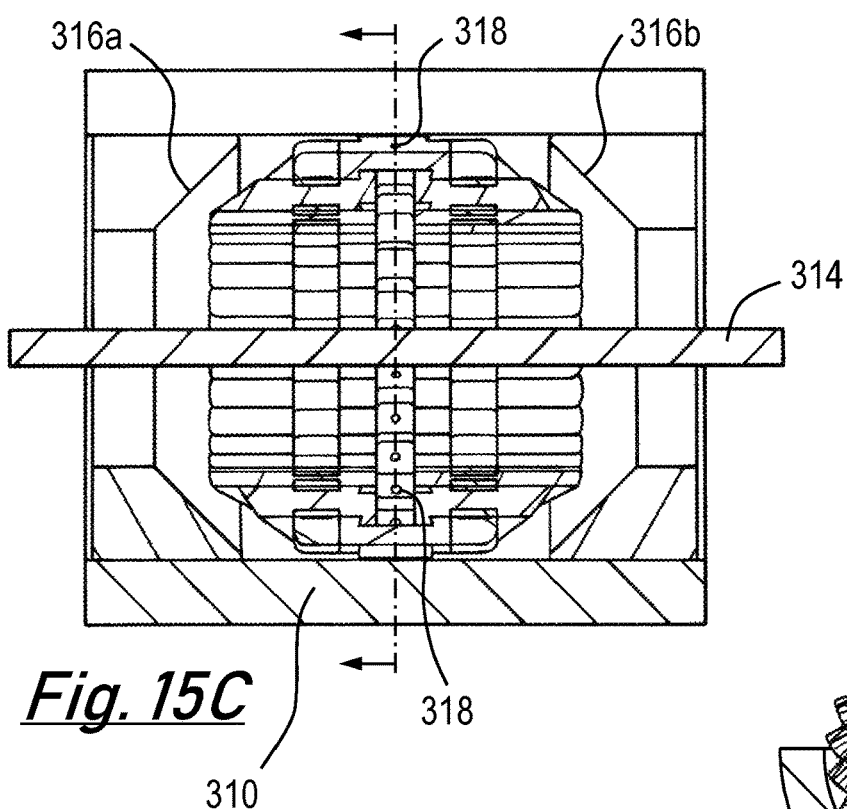
Figure 15D:
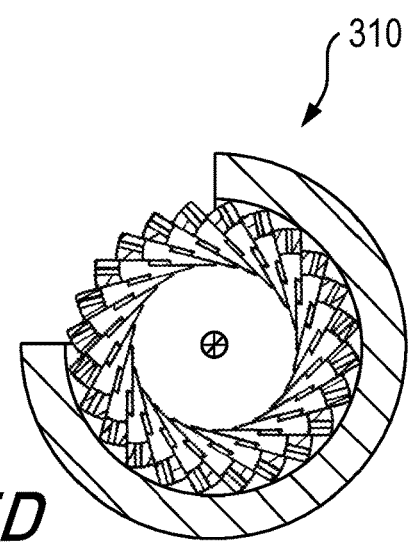
Figure 16A:
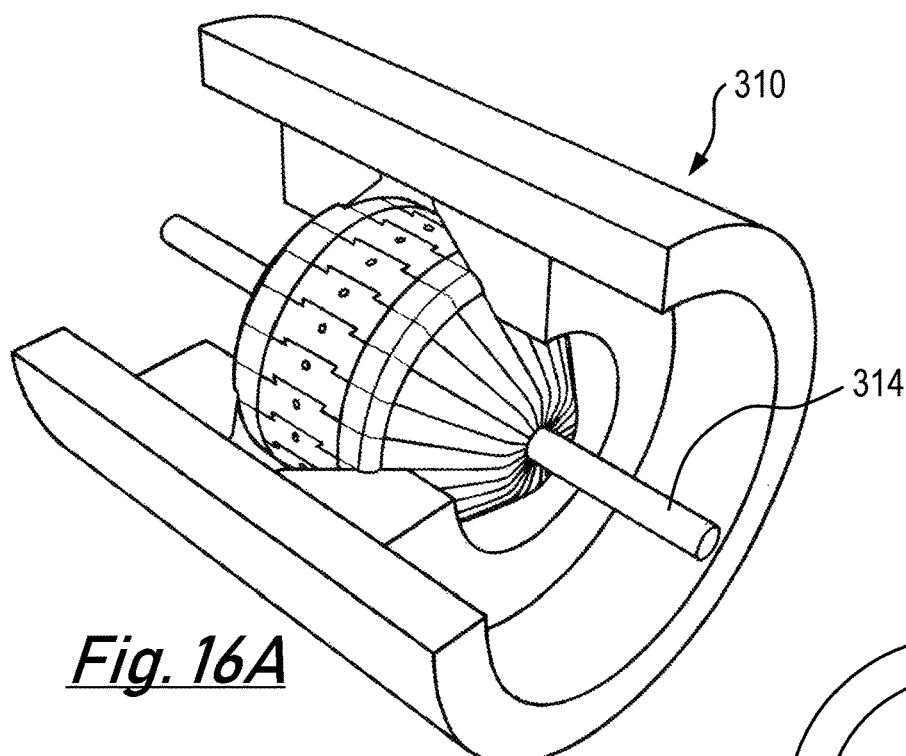
FIGS. 16A to 16D are schematic views of the locking tool of FIGS. 15A to 15D in a collapsed condition.
Figure 16B:
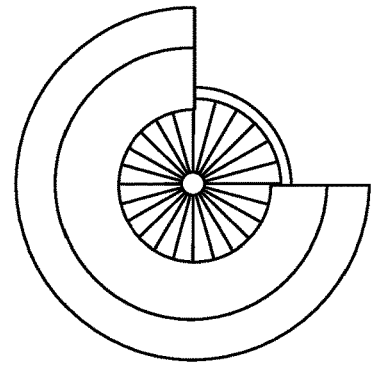
Figure 16C:
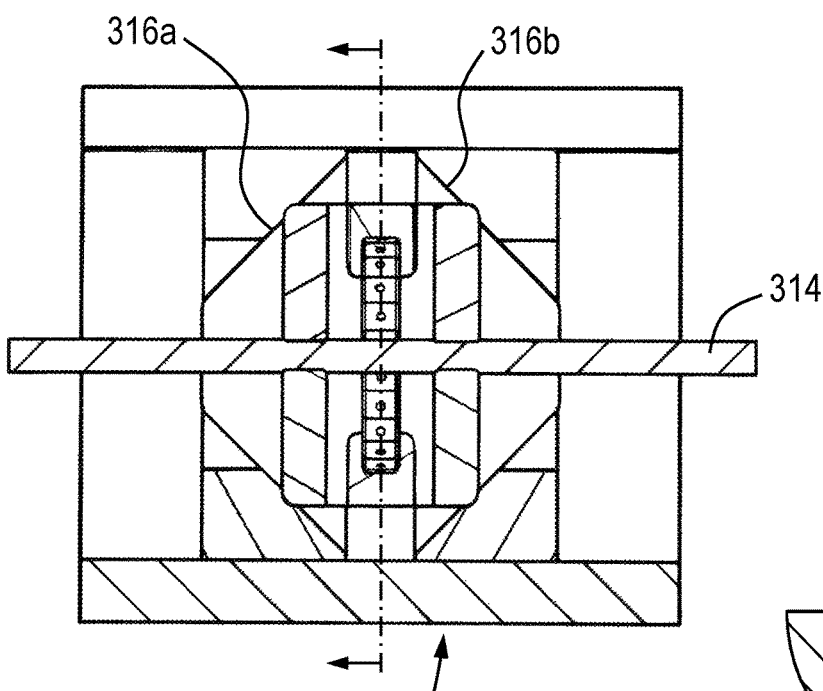
Figure 16D:
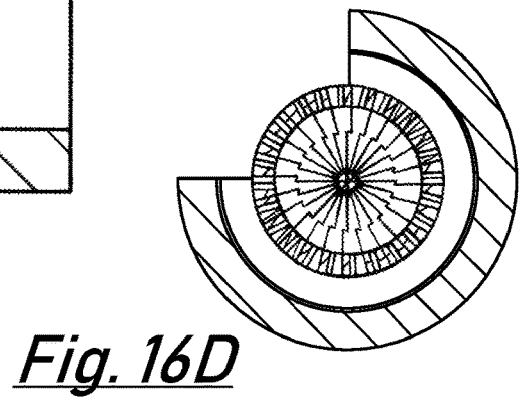
Figure 17B:
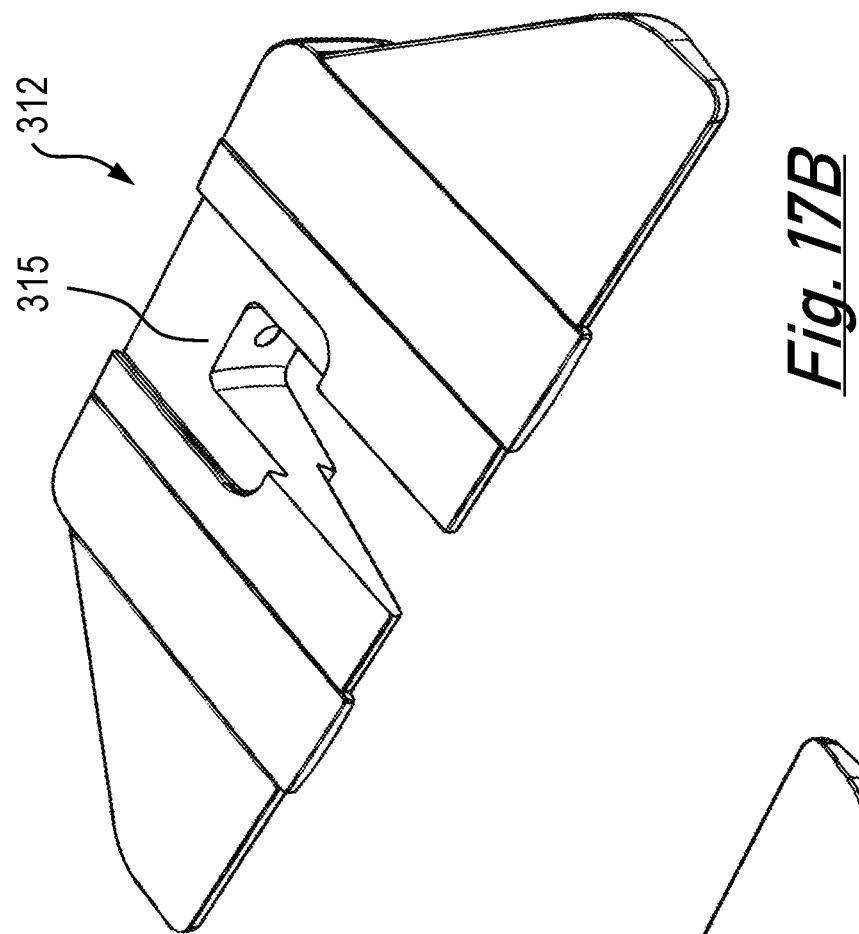
FIGS. 17A and 17B are isometric views of an element of the seal apparatus of FIGS. 15A to 15D.
Figure 17A:
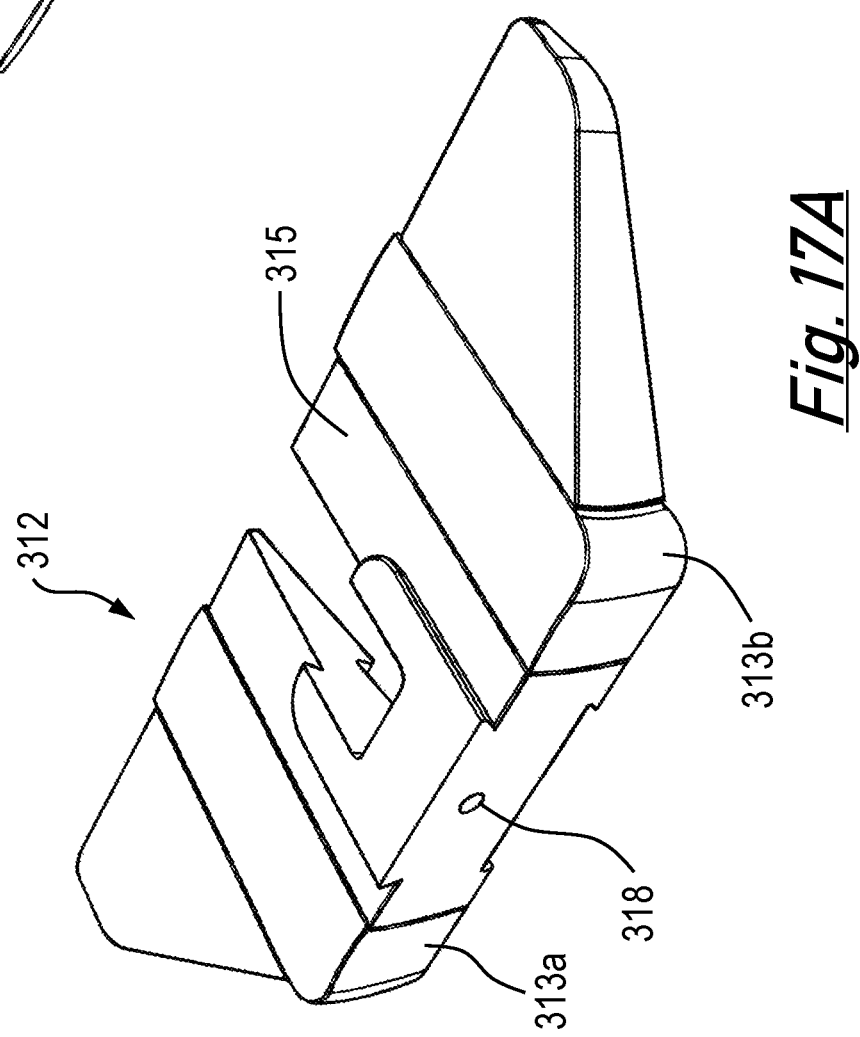

FIG. 13A is a longitudinal schematic view through a locking tool according to an embodiment of the invention. FIG. 13B is a schematic view of the locking tool, and FIGS. 14A and 14B are equivalent views of the locking tool in a set position.

The locking tool, generally depicted at 130, comprises an upper housing 131, which provides an upper connecting profile, and a lower housing 132. In the run position, the upper and lower housings 131, 132 are assembled on a mandrel in an axially separated position. The upper housing 131 is secured on the mandrel by a set of shear screws.

An actuation sleeve is disposed on the mandrel, and connects the upper housing with the lower housing. A lower part of the actuation sleeve is cylindrical, and a lower end of the actuation sleeve is provided with a pair of conical wedge profiles. An upper part of the actuation sleeve has part cylindrical sections removed, such that only parts of the actuation sleeve, circumferentially separated around the sleeve, extend to its upper end and engage with the upper housing. Windows formed by removing part sections of the actuation sleeve correspond to the locations of detent fingers of the mandrel, and accommodate radially extending formations at the end of the detent fingers.

The locking tool also comprises a locking and sealing assembly, generally shown at 140, located in an annular space between first and second subs of the lower housing. The locking and sealing assembly 140 is similar to apparatus 10; individual elements assembled to form the ring structure are similar to the elements 12, and their form and function will be understood from FIGS. 1 to 7 and 8 and their accompanying descriptions. In particular, each compound element comprises a substrate having a pair of planar contact surfaces which mutually supporting adjacent elements, and the contact surfaces are oriented on tangential planes. Seal elements are formed on the substrate to seal an outer surface an and an inner surface of an annular space.

In the run position, the ring structure is flush with the immediately adjacent outer diameter of the outer housing. In an alternative configuration, the ring structure may be recessed with respect to the outer housing, such that they have a reduced outer diameter. The outer diameter of the seal elements less than the outer diameter of the ring structures in their retracted position, such that the seal elements are recessed in the tool.

Operation of the locking tool will now be described with additional reference to FIGS. 14A and 14B. The locking tool 130 is run into the wellbore to a location in the completion which comprises a locking profile, generally shown at 148. The locking and sealing assembly 140 is positioned so that it is aligned with a locking recess 146 in the locking profile. Alignment of the locking and sealing assembly with the locking profile is ensured by the provision of a no-go profile on the lower housing assembly, and a corresponding no-go profile on the completion at a defined axial separation from the locking profile.

With the locking tool in position and the no-go profile engaged, a downward force imparted on the upper housing 131 is transferred to the actuation sleeve. The lower housing 132 and mandrel is held up by the no-go, and the shear screws shear, enabling the actuation sleeve to move downwards relative to the lower housing until the wedge profile of the actuation sleeve is brought into contact with the ring structure 140. As described with reference to previous embodiments, the wedge profiles direct a component of the axial force in a radially outward direction, to force the elements of the ring structure to a radially outward position.

One advantage of the locking mechanism described with respect to FIGS. 13 and 14 is that the locking mechanism is provided with an integrated seal element, and does not require a seal assembly at an axially separated point. This enables a reduction in the length of the tool. The integrated seal is surrounded at its upper and lower edges by the surfaces of the ring structure, which avoid extrusion of the seal.

In addition, the ring structure provides a smooth, unbroken circumferential surface which engages the locking recess, providing upper and lower annular surfaces in a plane perpendicular to the longitudinal axis of the bore. This annular surface is smooth and unbroken around the circumference of the ring structures, and therefore the lock is in full abutment with upper and lower shoulders defined in the locking profile. This is in contrast with conventional locking mechanisms which may only have contact with a locking profile at a number of discrete, circumferentially-separated locations around the device. The increased surface contact provided by this embodiment of the invention enables a locking mechanism which can support larger axial loads being directed through the lock, and therefore the lock can be rated to a higher maximum working pressure. Alternatively, an equivalent pressure rating can be provided in a lock which has reduced size and/or mass.

Another advantage of this embodiment of the invention is that the seal bore (i.e. the part of the completion with which the elastomer creates a seal) can be recessed in the locking profile. In this embodiment, the inner diameter of the locking profile on either side of the lock recess 146 is less than the inner diameter of the seal bore. The benefit of this configuration is that the seal bore is protected from the passage of tools and equipment through the locking profile.

This avoids impact with the seal bore which would tend to damage the seal bore, reducing the likelihood of reliably creating a successful seal.

In the foregoing embodiment, the benefits of the principles of the invention to a downhole locking mechanism are described. Similar benefits may be delivered in latching arrangements used in connectors, such as so called "quick connect" mechanisms used for latched connection of tubular components. The principles of the invention may also be applied to subsea connectors such as tie-back connectors.

Additional applications of the apparatus are possible which exploit its ability to effectively perform one or more of blocking or sealing an annular path. A further application is described with reference to FIGS. 15A to 17B, which show a wireline valve 310 comprising a seal apparatus 311 similar to the seal apparatus 10. The sealing apparatus 311 is formed from multiple compound elements 312, each comprising a substrate and a pair of seal members. The geometry of the seal elements 312 is consistent with the principles described in other embodiments, and the seal elements are assembled together to form an expanding and collapsing ring structure. The seal elements 312 comprise a substrate 315 which carries a pair of sealing members 313a, 313b The elements also comprise ports 318 for the injection of grease to the wireline in use.

FIGS. 15A to 15D shows the apparatus in its default expanded condition, to which it is biased by an internal biasing spring. The apparatus defines a bore through which an object, in this case a wireline 314, extends. Actuation of the apparatus by opposing inverse cone actuation wedges 316a, 316b causes relative tangential sliding movement of the individual elements to the collapsed condition shown in FIGS. 16A to 16D, at which the seal members 313a, 313b of the seal apparatus form an inner seal against the wireline 314, and an outer seal with the actuation wedges 316a, 316b.

The invention in its various forms benefits from the novel structure and mechanism of the apparatus. At an optimal expansion condition, the outer surfaces of the individual seal elements of an expanding seal apparatus combine to form a complete circle with no gaps in between the individual elements, and therefore the seal apparatus can be optimised for a specific diameter, to form a perfectly round expanded seal ring (within manufacturing tolerances). The design of the expansion apparatus also has the benefit that a degree of under expansion or over expansion (for example, to a slightly different radial position) does not introduce significantly large gaps.

Similarly, for a collapsing sealing apparatus, the outer surfaces of the individual seal elements combine to form a complete circle with no gaps in between the individual elements to form a perfectly round collapsed seal ring. The design of the collapsing apparatus also has the benefit that a degree of under collapse or over collapse (does not introduce significantly large gaps and still enables an effective seal.

It is a feature of the invention that the elements are mutually supported before, throughout, and after expansion, and do not create gaps between the individual elements during expansion or at the fully expanded position. In addition, the arrangement of seal elements in a circumferential ring, and their movement in a plane perpendicular to the longitudinal axis, facilitates the provision of smooth side faces or flanks on the expanded seal apparatus. With deployment of the seal elements in the plane of the ring structure, the width of the ring structure does not change. This enables use of the apparatus in close axial proximity to other functional elements, such as slip assemblies and anti-extrusion rings.

Various modifications to the above-described embodiments may be made within the scope of the invention, and the invention extends to combinations of features other than those expressly claimed herein. In particular, the different embodiments described herein may be used in combination, and the features of a particular embodiment may be used in applications other than those specifically described in relation to that embodiment.

The invention claimed is:

1. A seal apparatus comprising:
a seal assembly comprising a plurality of elements assembled together to form a ring structure around a longitudinal axis;
wherein the ring structure is operable to be moved between an expanded condition and a collapsed condition by movement of the plurality of elements;
wherein the plurality of elements is operable to be moved between the expanded condition and the collapsed condition by the plurality of elements sliding with respect to one another along respective contact surfaces;
wherein each of the plurality of elements is an element comprising a substrate and at least one seal member disposed on a part of a surface of the element;
wherein the ring structure has a same width along the longitudinal axis in the collapsed condition and the expanded condition.

2. The seal apparatus of claim 1, wherein the at least one seal member is a unitary seal member configured to conform, deform, or compress in use.

3. The seal apparatus of claim 1, wherein the at least one seal member defines a part of an outer surface of the element.

4. The seal apparatus of claim 1, wherein the substrate is formed from a material with greater rigidity and/or hardness than the material of the seal member.

5. The seal apparatus of claim 1, wherein the ring structure is operable to be expanded to a seal diameter, wherein the plurality of elements are presented to a surface in use at the seal diameter, and wherein the seal diameter is an outer diameter of the ring structure.

6. The seal apparatus of claim 1, wherein the seal apparatus defines one or more anti-extrusion and/or support rings for an adjacent seal assembly.

7. The seal apparatus of claim 1, wherein each element comprises a first contact surface and a second contact surface respectively in abutment with first and second adjacent elements, and wherein the first contact surface and the second contact surface are orientated in non-parallel planes, each of the non-parallel planes being tangential to a circle centered on the longitudinal axis.

8. The seal apparatus of claim 1, wherein the plurality of elements are provided with interlocking profiles for interlocking with an adjacent element.

9. The seal apparatus of claim 1, wherein the substrate comprises a recess on a surface of the substrate, the recess defining a volume which receives at least a part of the at least one seal member.

10. The seal apparatus of claim 9, wherein the recess is continuous around two or more of: an outer surface of the substrate, an inner surface of the substrate, and a first contact surface or a second contact surface of the substrate.

11. The seal apparatus of claim 1, wherein the seal member is formed to a first width and/or first volume on an outer surface of the substrate, the outer surface being presented to a seal surface external to the seal assembly in use, wherein the seal member is formed to a second width and/or second volume on an inner surface of the substrate, the inner surface being presented to a seal surface internal to the seal assembly in use, and wherein second width and/or second volume is less than the first width and/or first volume.

12. The seal apparatus of claim 1, comprising at least one formation configured to impart a radial expanding or collapsing force component to the elements of the ring structure from an axial actuation force.

13. The seal apparatus of claim 1, comprising a biasing means configured to bias the ring structure to one of the expanded condition and the collapsed condition.

14. A seal apparatus comprising:
   a plurality of elements assembled together to form a ring structure around a longitudinal axis;
   wherein the ring structure is operable to be moved between an expanded condition and a collapsed condition;
   wherein in the expanded condition, the plurality of elements combine to form a solid seal ring structure having an outer surface;
   wherein each of the plurality of elements is an element comprising a substrate and at least one seal member disposed on a part of a surface of the element; and
   wherein the ring structure has a same width along the longitudinal axis in the collapsed condition and the expanded condition.

15. The seal apparatus of claim 14, wherein the outer surface comprises:
   a circular profile in a first plane parallel to a second plane of the ring structure, and
   a first surface portion configured for sealing with an external surface to the seal assembly.

16. The seal apparatus of claim 15, wherein the outer surface comprises a second surface portion and a third surface portion axially separated from the second surface portion, each of the second surface portion and third surface portion configured for sealing with an internal surface to the seal assembly.

17. An oilfield tool comprising the seal apparatus of claim 14, wherein the oilfield tool is a downhole tool selected from the group consisting of a plug, a packer, an anchor, a tubing hanger, or a downhole locking tool.

18. The seal apparatus of claim 14, wherein each element comprises a first contact surface and a second contact surface respectively in abutment with first and second adjacent elements, and wherein the first contact surface and the second contact surface are orientated in non-parallel planes, each of the non-parallel planes being tangential to a circle centered on the longitudinal axis.

19. A method of sealing a bore, the method comprising:
   providing a seal assembly comprising a plurality of elements assembled together to form a ring structure around a longitudinal axis, wherein each of the plurality of elements is an element comprising a substrate and at least one seal member disposed on a part of a surface of the element; and
   imparting a force to the ring structure to move the plurality of elements by sliding with respect to one another and thereby moving the ring structure from a collapsed condition to an expanded condition
   wherein the ring structure has a same width along the longitudinal axis in the collapsed condition and the expanded condition.

20. The method of claim 19, wherein each element comprises a first contact surface and a second contact surface respectively in abutment with first and second adjacent elements, and wherein the first contact surface and the second contact surface are orientated in non-parallel planes, each of the non-parallel planes being tangential to a circle centered on the longitudinal axis.

* * * * *